US012656561B2

(12) United States Patent
Lee

(10) Patent No.: US 12,656,561 B2
(45) Date of Patent: Jun. 16, 2026

(54) OPTICAL COUPLING STRUCTURE FOR OPTOELECTRONIC INTEGRATED CIRCUIT

(71) Applicant: AIP Inc., New Taipei City (TW)

(72) Inventor: Chia Lee, New Taipei City (TW)

( * ) Notice: Subject to any disclaimer, the term of this patent is extended or adjusted under 35 U.S.C. 154(b) by 264 days.

(21) Appl. No.: 18/510,668

(22) Filed: Nov. 16, 2023

(65) Prior Publication Data

US 2025/0035870 A1     Jan. 30, 2025

Related U.S. Application Data

(60) Provisional application No. 63/528,933, filed on Jul. 26, 2023.

(51) Int. Cl.
G02B 6/42          (2006.01)
(52) U.S. Cl.
CPC ......... G02B 6/4292 (2013.01); G02B 6/4249 (2013.01)
(58) Field of Classification Search
CPC .............. G02B 6/30; G02B 6/42; G02B 6/43
See application file for complete search history.

(56) References Cited

U.S. PATENT DOCUMENTS 9,995,881 B1 *   6/2018  Patel ...................... G02B 6/122
12,353,031 B1 *  7/2025  Chen ................... G02B 6/4243

2005/0163431 A1 *  7/2005  Moynihan ................ G02B 6/30
                                                        385/71
2018/0059331 A1 *  3/2018  Evans ...................... G02B 6/30
2019/0064454 A1    2/2019  Evans
2021/0271037 A1 *  9/2021  Brusberg ............. G02B 6/4228
2024/0027706 A1 *  1/2024  Tadayon ............. G02B 6/4214
2024/0027710 A1 *  1/2024  Li ........................ G02B 6/4206
2024/0402442 A1 * 12/2024  Chiu ................... G02B 6/4249
2025/0251557 A1 *  8/2025  Yang ...................... G02B 6/30

FOREIGN PATENT DOCUMENTS

CN    103033892 B    12/2014
CN    104280828 B     1/2019
CN    106526759 B     8/2019
CN    110799875 A     2/2020
TW    201400904 A     1/2014
TW    202248694 A    12/2022

* cited by examiner

*Primary Examiner* — Michael Stahl

(57)          ABSTRACT

An optical coupling structure for an optoelectronic integrated circuit includes a first connector and an optical fiber device. The first connector is disposed on the optoelectronic integrated circuit and includes a base including a lower surface and a front end, and a waveguide device assembled in the base and including a first surface, a first guide surface adjoining the first surface and located at the front end, and a plurality of optical waveguide paths extend to the first guide surface. The optical fiber device includes a second connector including a connecting surface and detachably connected to the first connector such that the connecting surface and the first guide surface directly face each other.

19 Claims, 26 Drawing Sheets

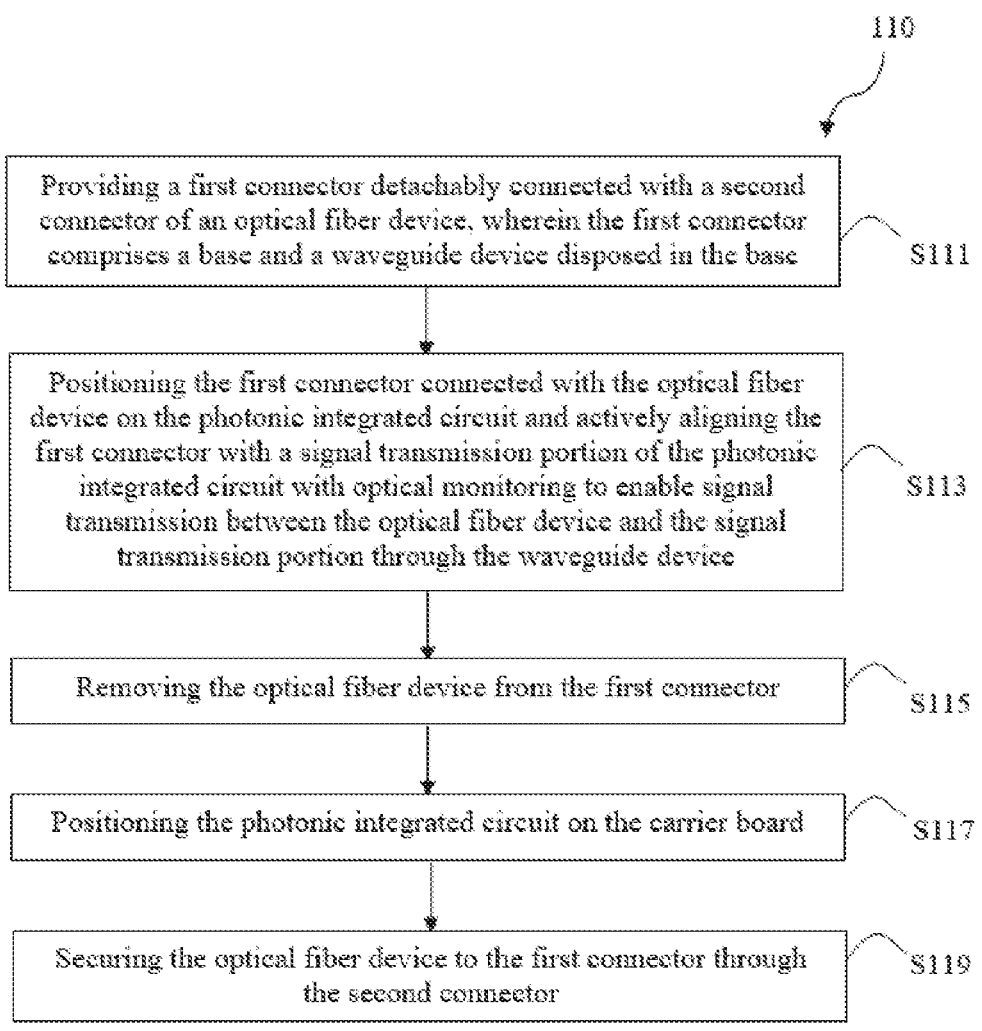

110

Providing a first connector detachably connected with a second connector of an optical fiber device, wherein the first connector comprises a base and a waveguide device disposed in the base    S111

Positioning the first connector connected with the optical fiber device on the photonic integrated circuit and actively aligning the first connector with a signal transmission portion of the photonic integrated circuit with optical monitoring to enable signal transmission between the optical fiber device and the signal transmission portion through the waveguide device    S113

Removing the optical fiber device from the first connector    S115

Positioning the photonic integrated circuit on the carrier board    S117

Securing the optical fiber device to the first connector through the second connector    S119

FIG. 20

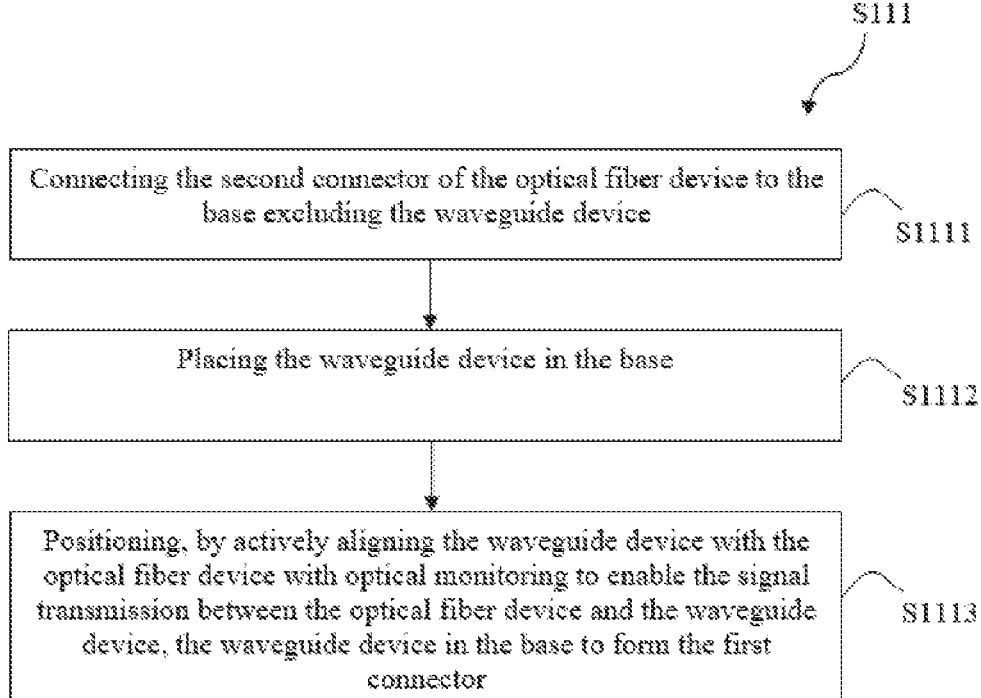

S111

| Connecting the second connector of the optical fiber device to the base excluding the waveguide device | S1111 |

| Placing the waveguide device in the base | S1112 |

| Positioning, by actively aligning the waveguide device with the optical fiber device with optical monitoring to enable the signal transmission between the optical fiber device and the waveguide device, the waveguide device in the base to form the first connector | S1113 |

FIG. 21

OPTICAL COUPLING STRUCTURE FOR OPTOELECTRONIC INTEGRATED CIRCUIT

CROSS REFERENCE TO RELATED APPLICATIONS

This application claims the benefit of U.S. provisional patent application Ser. No. 63/528,933, filed Jul. 26, 2023, the entirety of which is incorporated by reference herein.

BACKGROUND OF INVENTION

1. Field of Invention

The present invention relates to a technical field of optoelectronic integrated circuits (OEIC), and particularly to an optical coupling structure for an OEIC.

2. Related Art

Optoelectronic integrated circuits (OEICs), using photons instead of electrons for calculation and data transmission in integrated circuits, bring great benefits to the development of industries requiring high-performance data exchange, long-distance interconnection, 5G facilities, and computing equipment. OEICs are configured with photonic integrated circuits (PICs) and electronic integrated circuits (EICs) and may be co-packaged as co-packaged optics (CPO).

Light data transmission between OEICs and devices connected to the OEICs are through optical components such as optical fibers. Current solutions utilize bonding connections for connecting optical fibers to PICS in such a way that reflective or focusing elements, such as optical lenses, zone plates, and the like, are disposed on ends of optical fibers for propagating light beams. In other words, optical fibers are permanently, fixedly connected with PICs, making them permanent connected. However, the permanent connection is made prior to at least one reflow process or back-end process, which is typically performed at a temperature over 220° C. As a result, the optical fibers are required to undergo the above-mentioned process and are susceptible to damage due to the high temperatures. In addition, such a permanent attachment between optical fibers and PICs also makes maintenance difficult.

SUMMARY OF INVENTION

An object of the present application is to provide an optical coupling structure, which is detachably connected to a photonic integrated circuit of an optoelectronic integrated circuit.

To achieve the above-mentioned object, one aspect of the present application provides an optical coupling structure for an optoelectronic integrated circuit, including a first connector disposed on the optoelectronic integrated circuit, and the optical coupling structure includes a base including a lower surface and a front end, and a waveguide device assembled in the base and including a first surface, a first guide surface adjoining the first surface and located at the front end, and a plurality of optical waveguide paths extending to the first guide surface. An optical fiber device includes a second connector including a connecting surface and detachably connected to the first connector such that the connecting surface and the first guide surface directly face each other.

Optionally, the base further includes a recessed portion passing through part of the front end and part of the lower surface of the base, and the waveguide device is disposed in the recessed portion.

Optionally, the optoelectronic integrated circuit includes a photonic integrated circuit, and the first connector is fixedly arranged on the photonic integrated circuit and includes a plurality of positioning elements arranged on the base.

Optionally, the base further includes a retaining wall extending and bent downward from the lower surface, and positioned adjacent to an edge of the photonic integrated circuit such that the retaining wall abuts against the edge of the photonic integrated circuit.

Optionally, the positioning elements are arranged on the retaining wall at the front end of the base and spaced apart from each other.

Optionally, the positioning elements are pin-like in shape and extend in an outward direction from the front end.

Optionally, the second connector further includes a plurality of attaching portions structured to detachably connect to the positioning elements of the first connector.

Optionally, the optical waveguide paths of the waveguide device are arranged in an array and configured to spatially correspond to a signal transmission portion included in the photonic integrated circuit.

Optionally, the optical fiber device further includes a plurality of optical fibers arranged to correspond to the optical waveguide paths of the waveguide device and having a plurality of fiber ends terminated at the second connector. The first guide surface of the waveguide device and the connecting surface of the second connector are located in front of or to coincide with the fiber ends of the optical fibers.

Optionally, a plurality of the first connectors are arranged on a same side of the photonic integrated circuit, each of the first connectors is connected with one optical fiber device, and the first connectors are spaced apart from each other at a spacing greater than or equal to a spacing between adjacent two of the second connectors.

Optionally, the optical coupling structure further includes a housing configured to hold the plurality of the optical fiber devices such that the optical fiber devices are movable in conjunction with the housing to be simultaneously and detachably connected to the first connectors.

Optionally, the optoelectronic integrated circuit further includes an electronic integrated circuit and a carrier board, and the electronic integrated circuit and the photonic integrated circuit are co-packaged with the carrier board.

Another aspect of the present application provides a method of forming an optical coupling structure for an optoelectronic integrated circuit, the optoelectronic integrated circuit including a photonic integrated circuit and a carrier board, and the method includes providing a first connector detachably connected with a second connector of an optical fiber device, and the first connector including a base and a waveguide device assembled in the base; positioning the first connector connected with the optical fiber device on the photonic integrated circuit and actively aligning the first connector with a signal transmission portion of the photonic integrated circuit with optical monitoring to enable signal transmission between the optical fiber device and the signal transmission portion through the waveguide device; removing the optical fiber device from the first connector; positioning the photonic integrated circuit on the carrier board; and securing the optical fiber device to the first connector through the second connector.

Optionally, after positioning the photonic integrated circuit on the carrier board, performing at least a reflow process or a back-end process on the first connector and the photonic integrated circuit in combination with the carrier board, without attachment of the optical fiber device.

Optionally, the step of providing the first connector detachably connected with the second connector of the optical fiber device includes connecting the second connector of the optical fiber device to the base excluding the waveguide device; placing the waveguide device in the base; and positioning, by actively aligning the waveguide device with the optical fiber device with optical monitoring to enable the signal transmission between the optical fiber device and the waveguide device, the waveguide device in the base to form the first connector.

Optionally, after the step of actively aligning the first connector with the signal transmission portion of the photonic integrated circuit with optical monitoring, performing a curing process on the base to secure the first connector to the photonic integrated circuit.

The optical coupling structure provided in the embodiments of the present application utilizes separate disposition of the first connector including the base and the waveguide device, and the optical fiber device including the second connector to achieve the detachable connection between the optical fiber device and the photonic integrated circuit. As a result, only the base and the waveguide device remain on the photonic integrated circuit, and the photonic integrated circuit with the first connector alone can be co-packaged with the carrier board and proceed to other processes. In doing so, the optical fiber device would not be damaged by the high temperatures during the above-mentioned processes, and a great diversity of applications can be fulfilled as well.

BRIEF DESCRIPTION OF DRAWINGS

To describe the technical solutions in the embodiments of the present application, the following briefly introduces the drawings for describing the embodiments. The drawings in the following description show merely some embodiments of the present application, and a person skilled in the art may still derive other drawings from these drawings without creative efforts.

FIG. 20 is a flowchart of a method of forming an optical coupling structure for an optoelectronic integrated circuit in accordance with an embodiment of the present application.

FIG. 21 is a flowchart of part of a method of forming an optical coupling structure for an optoelectronic integrated circuit in accordance with an embodiment of the present application.

DESCRIPTION OF PREFERRED EMBODIMENTS

Figure 1:
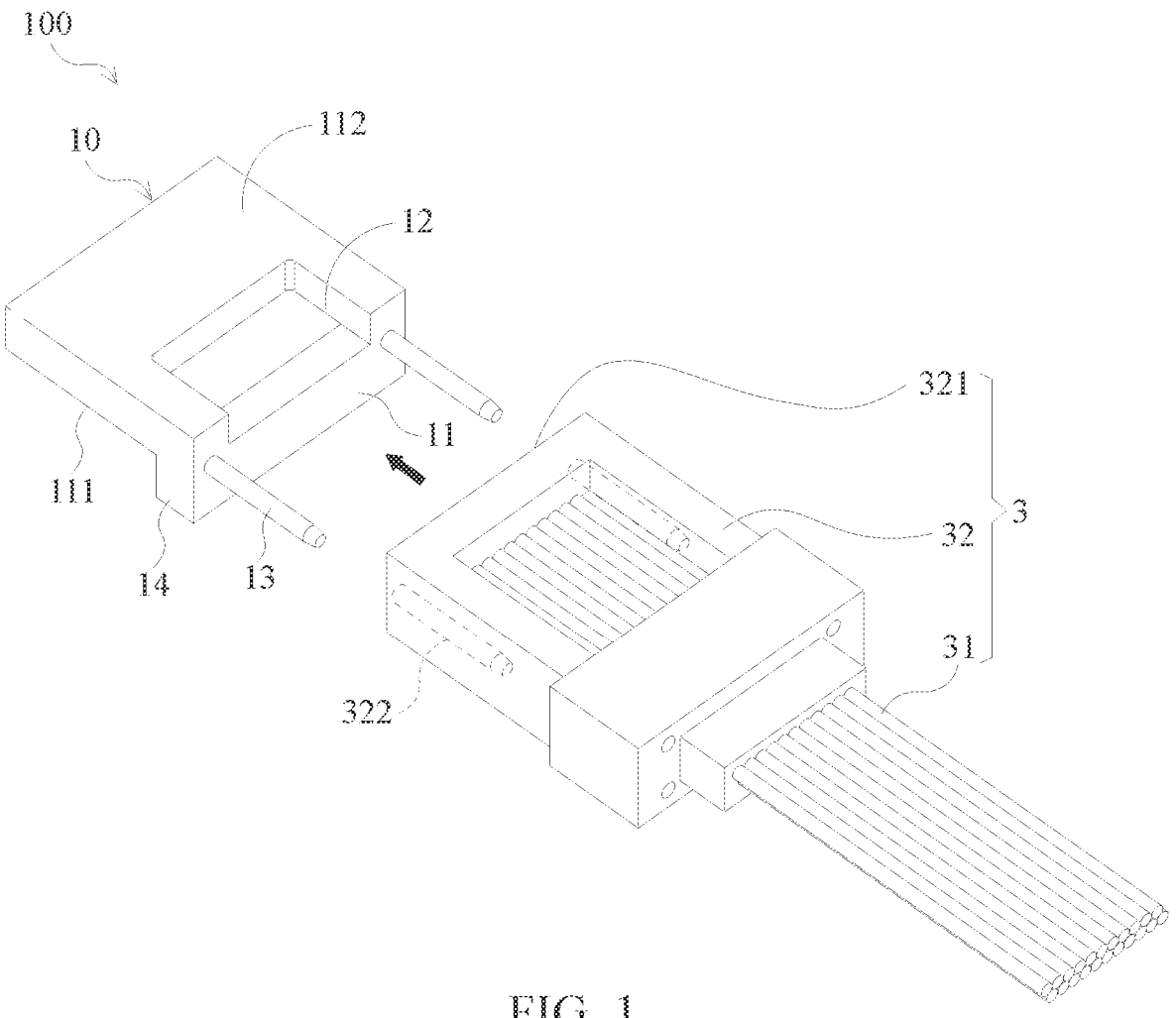
FIG. 1 is a schematic structural view of a base and an optical fiber device of an optical coupling structure in accordance with an embodiment of the present application.

The following embodiments are referring to the appendix drawings for exemplifying specific implementable embodiments of the present application. Directional terms described by the present application, such as upper, lower, front, back, left, right, inner, outer, side, etc., are only directions by referring to the drawings, and thus the used directional terms are used to describe and understand the present application, but the present application is not limited thereto.

It should be understood that, although the terms first, second, etc. may be used herein to describe various elements, these elements should not be limited by these terms. Unless indicated otherwise, these terms are only used to distinguish one element from another element. Thus, for example, a first element, a first component or a first section discussed below could be termed a second element, a second component or a second section without departing from the teachings of the present application.

Figure 2:
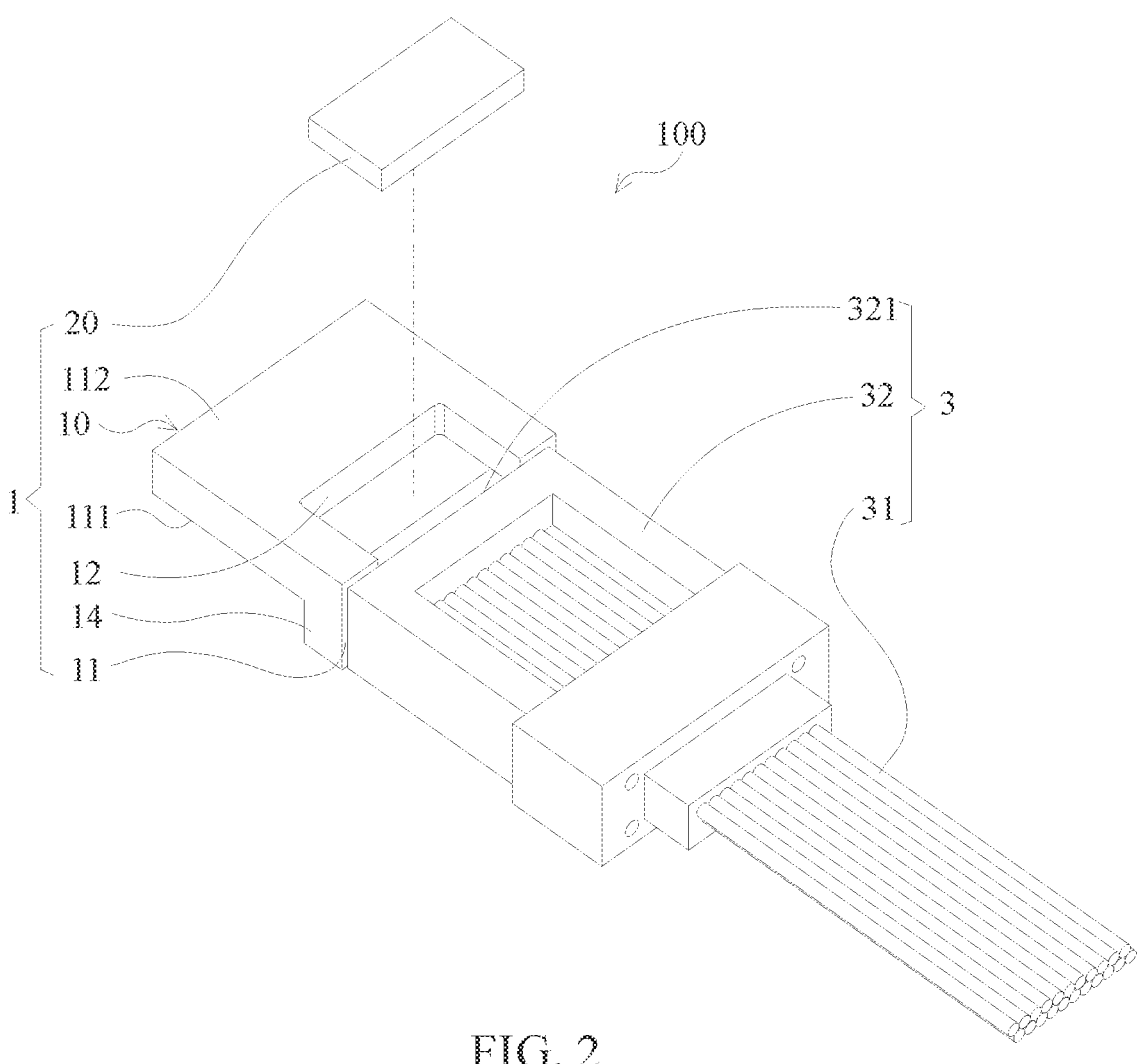
FIG. 2 is a schematic perspective view showing a process of a waveguide device to be assembled with the base.

The present application provides an optical coupling structure for an optoelectronic integrated circuit. Referring to FIGS. 1 and 2, FIG. 1 is a schematic structural view of a base 10 and an optical fiber device 3 of an optical coupling structure 100 in accordance with an embodiment of the present application. FIG. 2 is a schematic perspective view showing a process of a waveguide device 20 to be assembled with the base 10. As shown in FIG. 2, the optical coupling structure 100 includes a first connector 1 and the optical fiber device 3. The first connector 1 includes the base 10 and the waveguide device 20. The base 10 is rectangular in shape and includes a lower surface 111, an upper surface 112, and a front end 11 connected between the lower surface 111 and the upper surface 112. Preferably, the front end 11 is defined between corresponding edges of the lower surface 111 and the upper surface 112. In some embodiments, a recessed portion 12 is formed in the base 10 and is recessed from the front end 11. In detail, the recessed portion 12 is configured to pass through parts of the lower surface 111, the upper surface 112, and the front end 11 of the base 10. In some embodiments, referring to FIG. 1, a plurality of positioning elements 13 are symmetrically arranged on the front end 11 of the base 10 with respect to a middle of the base 10, and are spaced apart from each other on opposite sides of the recessed portion 12 and the waveguide device 20. A retaining wall 14 is formed on the base 10 and bends and extends downward from the lower surface 111 such that the base 10 has an inverted L-shaped cross-sectional profile. In this embodiment, there are two positioning elements 13, which are pin-like in shape and extend in an outward direction from the front end 11 on the retaining wall 14, respectively. In some embodiments, the base 10 is made of material having the characteristic of high temperature resistance, such as ceramic or metal, which is, for example, zirconium dioxide ($ZrO_2$). Alternatively, the base 10 may be made of non-metal material, such as organic binders (e.g. resin), polymer, or plastic.

Figure 3:
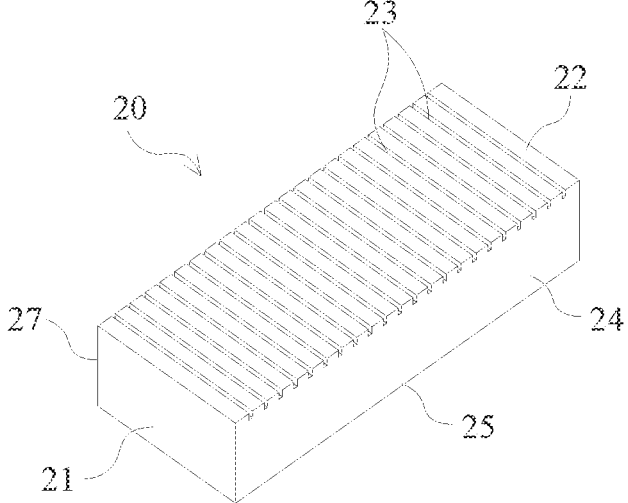
FIG. 3 is a schematic structural view of a waveguide device in accordance with an embodiment of the present application.
Figure 3A:
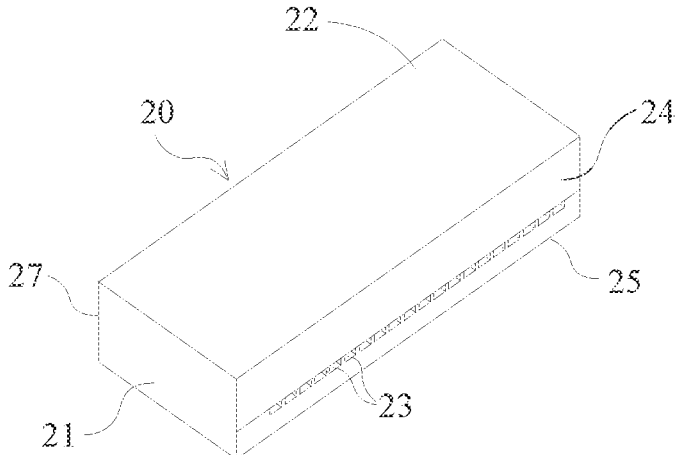
FIG. 3A is a schematic structural view of a waveguide device in accordance with an embodiment of the present application.

Referring to FIG. 3, FIG. 3 is a schematic structural view of the waveguide device 20. As shown in FIG. 3, the waveguide device 20 includes a waveguide substrate 21, a first surface 22 arranged on an upper portion of the waveguide substrate 21, a plurality of optical waveguide paths 23, a second surface 25 arranged on a lower portion of the waveguide substrate 21, a first guide surface 24 adjoining the first surface 22 and the second surface 25, and a second guide surface 27 arranged opposite to the first guide surface 24. In some embodiments, the optical waveguide paths 23 are groove-like shaped and are arranged in an array along the first surface 22 or the second surface 25 and extend to the first guide surface 24 for propagating light beams. Referring to FIG. 3A, FIG. 3A is a schematic structural view of the waveguide device 20 according to another embodiment of the present application. As shown in FIG. 3A, the optical waveguide paths 23 may be formed in the waveguide device 20 between the first surface 22 and the second surface 25. It should be noted that the optical waveguide paths 23 are not limited to the aforementioned types.

Preferably, the waveguide device 20 is made of a material containing, for example, silica. Alternatively, the waveguide device 20 may be made of a material containing silicon-on-insulator (SOI), lithium niobate ($LiNbO_3$), or polymers. In some embodiments, the waveguide device 20 may be formed using a material of such as fused silica, quartz, glass, borosilicate glass, etc. It should be noted that the waveguide device 20 includes a planar lightwave circuit (PLC). In some embodiments, the planar lightwave circuit may be configured in various ways, including, but not limited to, a straight line circuit, a splitter circuit, an arrayed waveguide grating wavelength multiplexer, and a cross connect-type circuit. Different types of waveguide circuits or devices can be utilized for the planar lightwave circuit in the embodiments of the present application.

Figure 4:
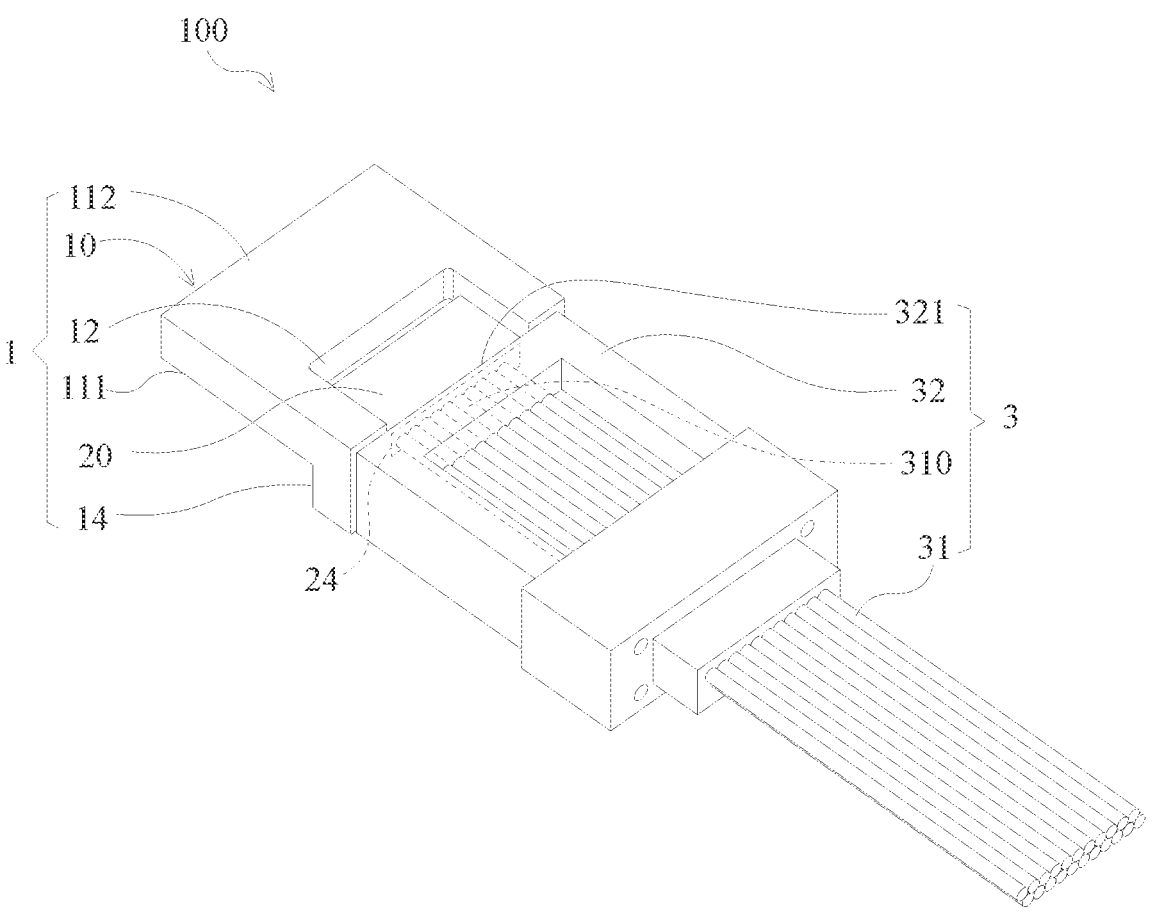
FIG. 4 is a schematic assembly view of a first connector and the optical fiber device in accordance with an embodiment of the present application.

As shown in FIG. 1 and FIG. 2, the optical fiber device 3 is provided to detachably connect to the first connector 1. The optical fiber device 3 includes a plurality of optical fibers 31 and a second connector 32 structured to connect to the first connector 1. Referring from FIG. 1 to FIG. 4, FIG. 4 is a schematic assembly view of the first connector 1 and the optical fiber device 3 in accordance with an embodiment of the present application. In detail, the optical fibers 31 are arranged to correspond to the optical waveguide paths 23 of the waveguide device 20 and have a plurality of fiber ends 310 terminated at the second connector 32 (as shown in FIG. 4). In this embodiment, the second connector 32 functions as an optical multi-channel connector and includes a connecting surface 321 arranged facing the front end 11 of the base 10, and a plurality of attaching portions 322 arranged to correspond to the pin-like positioning elements 13 (as shown in FIG. 1). Each of the attaching portions 322 is hole-like in shape, which allows insertion of the pin-like positioning elements 13 and enables a snug fit between the attaching portions 322 and the positioning elements 13, so that the second connector 32 can be tightly connected to the first connector 1. In this arrangement, the fiber ends 310 of the optical fibers 31 are positioned to directly face the recessed portion 12 at the front end 11 of the base 10.

Figure 5:
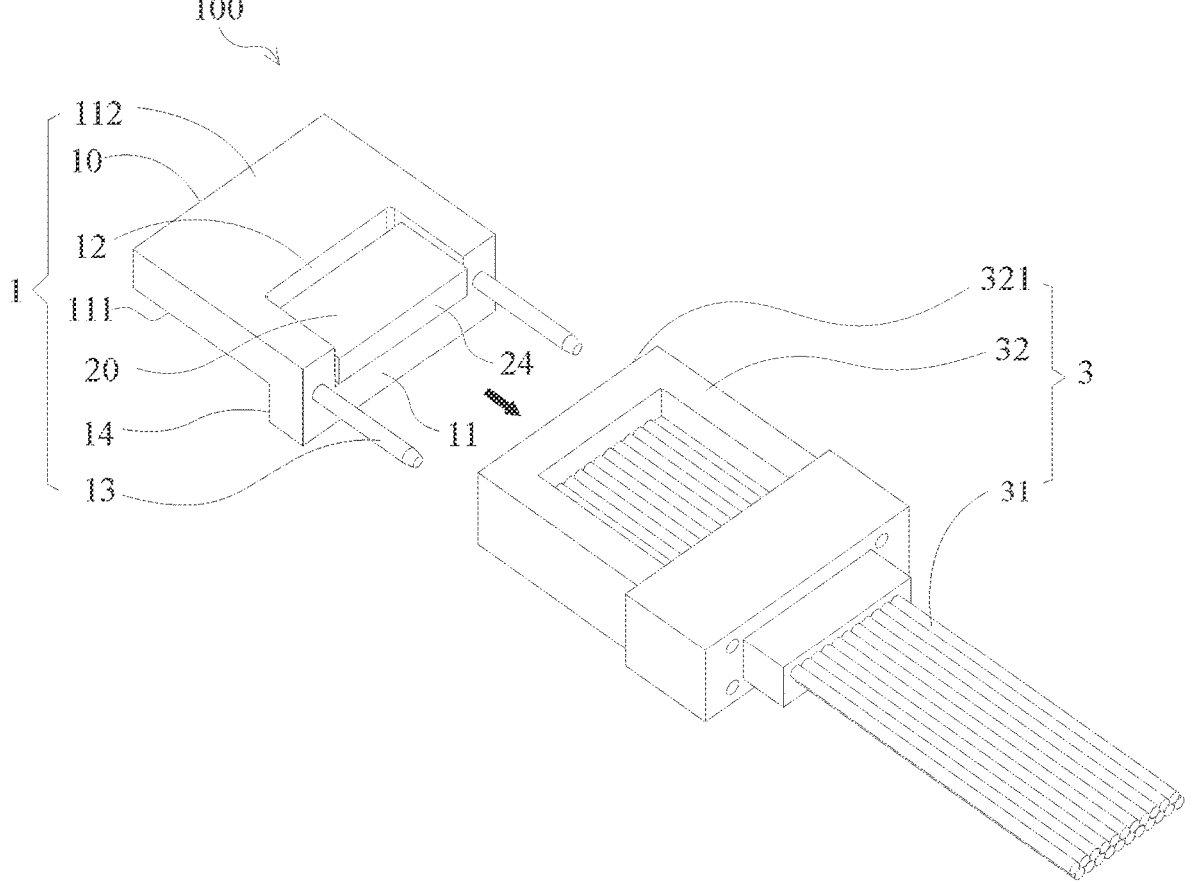
FIG. 5 is a schematic perspective view showing the optical fiber device is removed from the first connector shown in FIG. 4.

Referring to FIGS. 2, 4, and 5, FIG. 5 is a schematic perspective view showing the optical fiber device 3 is removed from the first connector shown in FIG. 4. As shown in FIG. 2, to position the waveguide device 20 in the base 10, first, the base 10 and the optical fiber device 3 are detachably connected together. Then, the waveguide device 20 is placed in the recessed portion 12 and is actively aligned with the optical fibers 31 of the optical fiber device 3 with optical monitoring to enable signal transmission between the optical fibers 31 and the waveguide device 20. Once the waveguide device 20 is accurately positioned in place, permanently secure the waveguide device 20 to the base 10 in the recessed portion 12 by applying glue or curing substance or by another securing means. As shown in FIG. 4, the base 10 and the waveguide device 20 collectively configure the first connector 1. After the first connector 1 is prepared, as shown in FIG. 5, the optical fiber device 3 can be removed from the base 10 of the first connector 1. In some embodiments, when there are multiple waveguide devices 20 need to be positioned in a plurality of the bases 10, respectively, repeat the above-mentioned processes to complete the disposition of the waveguide devices 20 in the bases 10 in turn.

Still referring to FIG. 3 and FIG. 4, in some embodiments, the optical fibers 31 are arranged in parallel with each other in a single row or multiple rows and extending to and exposed at the connecting surface 321 for directly propagating light beams to the waveguide device 20. In some embodiments, the optical fibers 31 may be, for example, single-mode fibers, multi-mode fibers, or polarization-maintaining fibers. When being connected in place, the first guide surface 24 of the waveguide device 20 and the connecting surface 321 of the second connector 32 are located in front of or to coincide with the fiber ends 310 of the optical fibers 31. It should be noted that in some embodiments, no reflective or focusing elements, such as optical lenses, zone plates, and the like are provided at the fiber ends 310 of the optical fibers 31 between the first guide surface 24 and the connecting surface 321. In other embodiment, there is optical glue applied to the fiber ends 310 of the optical fibers 31 between the first guide surface 24 and the connecting surface 321 to avoid sharp changes in refractive index. Alternatively, an antireflective coating layer (not shown) may be applied to a side of the fiber ends 310 or the first guide surface 24 or both sides of the fiber ends 310 and the first guide surface 24 to prevent signal loss, which may be caused by mismatches at boundaries between the fiber ends 310 and the first guide surface 24. In some embodiments, for the same reason as noted above, optical lenses may also be provided at the boundaries between the fiber ends 310 and the first guide surface 24. In another embodiment, no element or substance is provided at the boundaries between the fiber ends 310 and the first guide surface 24 such that the fiber ends 310 and the first guide surface 24 are in direct physical contact with each other.

Figure 6:
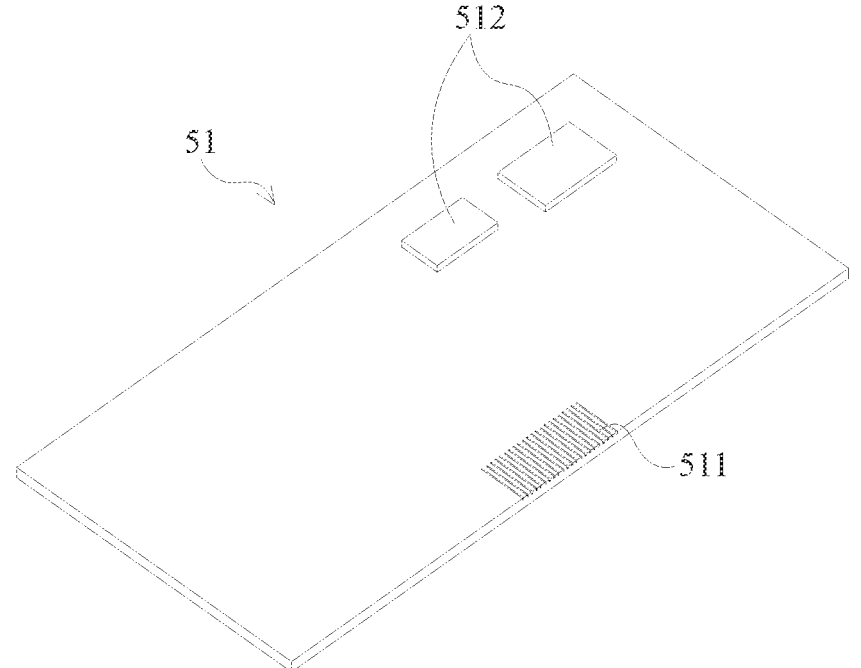
FIG. 6 is a schematic structural view of a photonic integrated circuit in accordance with an embodiment of the present application.

Referring to FIG. 6, it shows a photonic integrated circuit 51 in accordance with an embodiment of the present application. The photonic integrated circuit 51 includes two or more photonic components 512 which form a functioning circuit. In some embodiments, the photonic integrated circuit 51 is a silicon-based photonic integrated circuit, and preferably, a silicon nitride photonic integrated circuit. In detail, the photonic integrated circuit 51 includes at least a signal transmission portion 511 for light signal transmission with the waveguide device 20.

Figure 7:
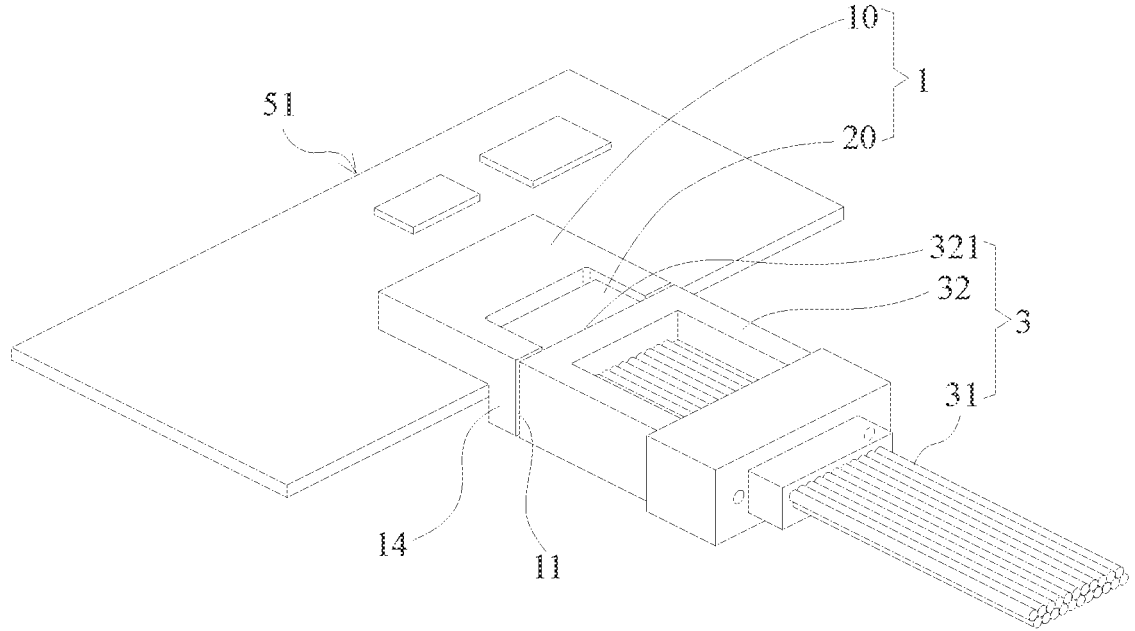
FIG. 7 is a perspective assembly view of the optical coupling structure and the photonic integrated circuit in accordance with an embodiment of the present application.
Figure 8:
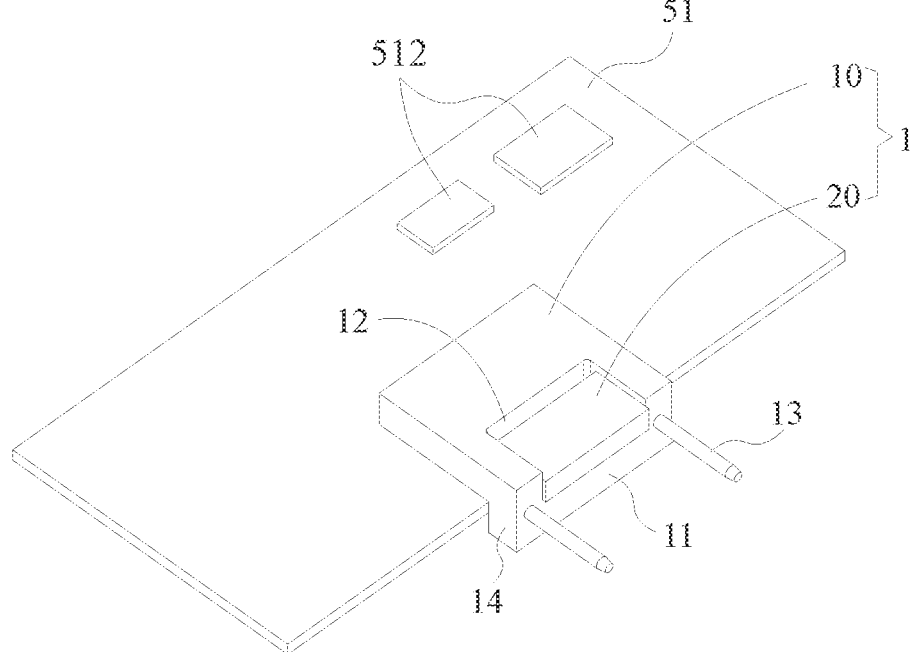
FIG. 8 is an assembly view of the first connector and the photonic integrated circuit shown in FIG. 7, without the attachment of the optical fiber device.

Referring from FIG. 6 to FIG. 8, FIG. 7 is a perspective assembly view of the optical coupling structure 100 and the photonic integrated circuit 51 in accordance with an embodiment of the present application, and FIG. 8 is an assembly view of the first connector 1 and the photonic integrated circuit 51 shown in FIG. 7, without the attachment of the optical fiber device 3. In positioning the first connector 1 on the photonic integrated circuit 51, the first connector 1, which includes the waveguide device 20 disposed in the base 10, and the optical fiber device 3 are actively aligned with the signal transmission portion 511 with optical monitoring, so that light signals can be transmitted between the optical fiber device 3 and the signal transmission portion 511 through the waveguide device 20. Upon completion of the positioning of the first connector 1 on the photonic integrated circuit 51, the base 10 is being cured on the signal transmission portion 511 making the first connector 1 fixedly secured to the photonic integrated circuit 51. In some embodiments, when multiple first connectors 1 need to be disposed on one or different photonic integrated circuits 51, repeat the above-mentioned processes to complete the disposition of each of the first connectors 1 on the corresponding photonic integrated circuit 51.

In this embodiment, a vertical projection of the base 10 on a horizontal plane does not coincide with a vertical projection of the second connector 32 on the horizontal plane, so as to achieve a low profile of the photonic integrated circuit 51 with the first connector 1. It should be noted that a propagation range of the light beam passing through the optical waveguide paths 23 of the waveguide device 20 from a light transceiver module (not shown) of the photonic integrated circuit 51 can be enlarged from about 2 microns to 8 microns, which allows the light beam to completely go through the optical fibers 31 without resulting in signal loss.

Figure 8A:
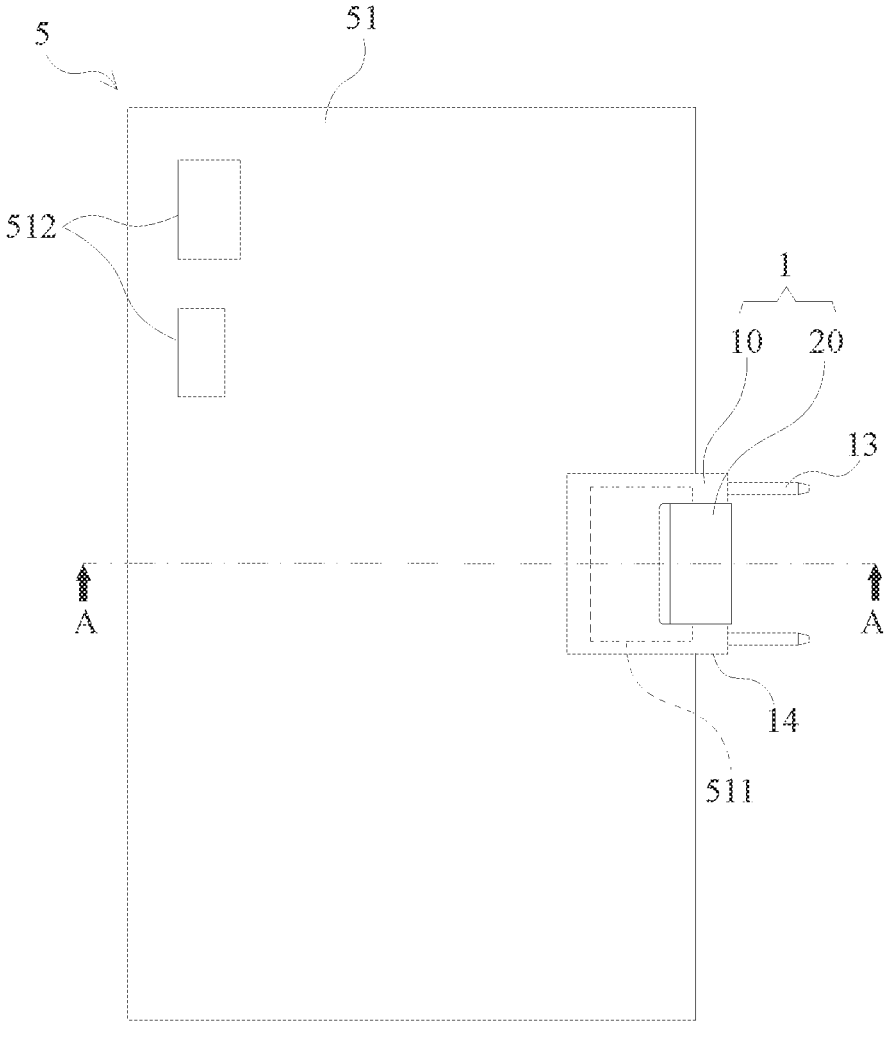
FIG. 8A is a top plan view of the assembly of the first connector and the photonic integrated circuit shown in FIG. 8.
Figure 9A:
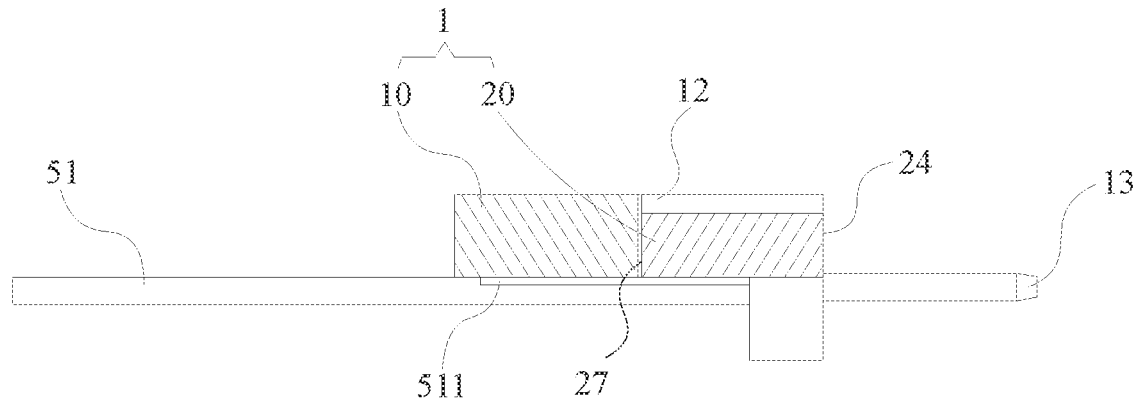
FIG. 9A is a schematic cross-sectional view taken along line A-A of FIG. 8A.

Referring from FIGS. 7 to 9A, FIG. 8A is a top plan view of FIG. 8, and FIG. 9A is a schematic cross-sectional view taken along line A-A of FIG. 8A. As shown in FIGS. 8 and 8A, after the first connector 1 is disposed in place on photonic integrated circuit 51, the optical fiber device 3 is removed from the first connector 1. At this phase, as shown in FIG. 9A, part of the waveguide device 20 directly faces the signal transmission portion 511, and the positioning elements 13 extend in the outward direction from the first guide surface 24 and are substantially perpendicular to the first guide surface 24. It should be noted that the profile of the signal transmission portion 511 shown in FIG. 6 is for illustrative purpose only, which may be larger in size or diverse in layout according to actual design of the photonic integrated circuit 51. In the embodiment shown in FIG. 9A, the second guide surface 27 is located above the signal transmission portion 511, and a tilted micro-reflecting component (not shown for clarity) may be provided to correspond to each of the optical waveguide paths 23 of the waveguide device 20 in order to direct a light beam from the optical fiber 31 to the signal transmission portion 511 and vice-versa. In some embodiments, the tilted micro-reflecting component may be coated with a reflective coating layer. In addition, as shown in FIG. 7, when the second connector 32 is plugged to the first connector 1, the retaining wall 14 serves to prevent displacement of the first connector 1 by abutting against an edge of the photonic integrated circuit 51.

Figure 9B:
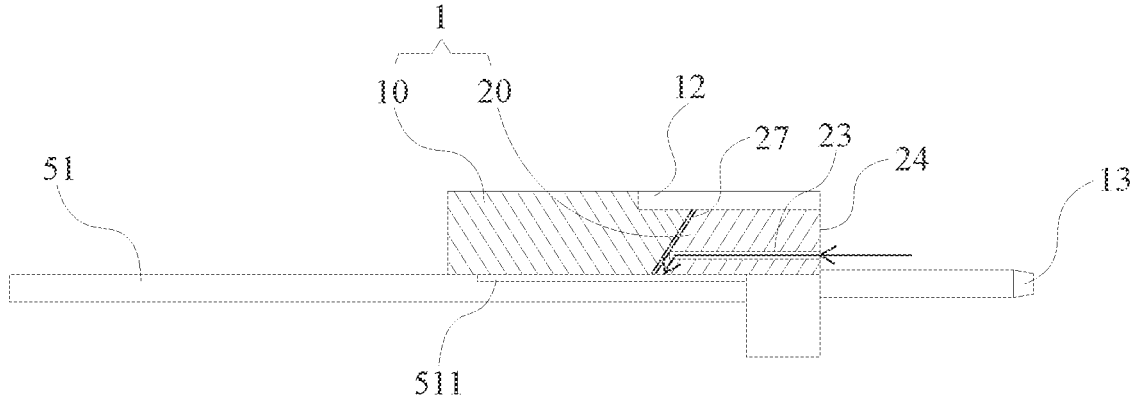
FIG. 9B is a schematic cross-sectional view in accordance with another embodiment of the present application taken from similar section as the assembly of the first connector and the photonic integrated circuit shown in FIG. 9A.

Referring to FIG. 9B, FIG. 9B is a schematic cross-sectional view in accordance with another embodiment of the present application taken from similar section as the assembly of the first connector 1 and the photonic integrated circuit 51 shown in FIG. 8A. In this embodiment, a second guide surface 27 of a waveguide device 20 assembled with the base 10 is tilted and located above the signal transmission portion 511 at an acute angle with respect to the signal transmission portion 511. In some embodiments, the second guide surface 27 may be coated with a reflection layer (not shown). Be means of the second guide surface 27, a light beam from the optical fiber 31 passing through the optical waveguide paths 23 of the waveguide device 20 can be reflected and directed to the signal transmission portion 511 and vice-versa.

Figure 8B:
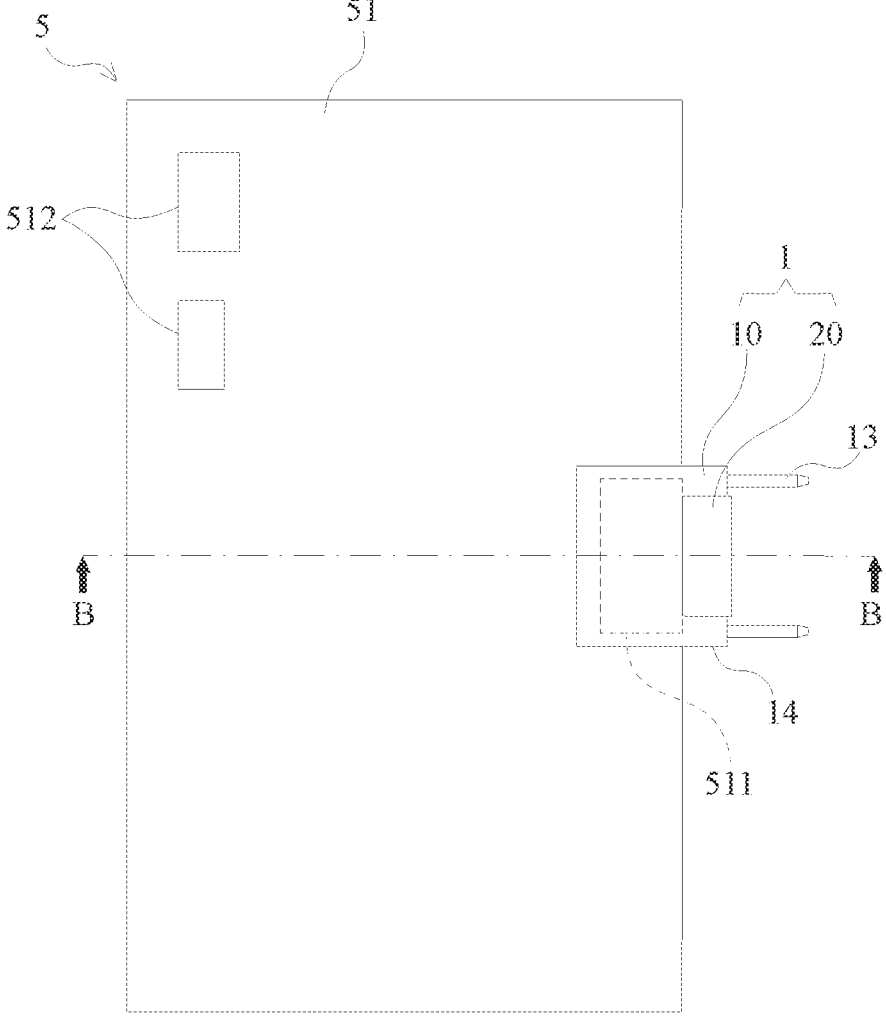
FIG. 8B is a top plan view of the assembly of the first connector and the photonic integrated circuit in accordance with another embodiment of the present application.
Figure 9C:
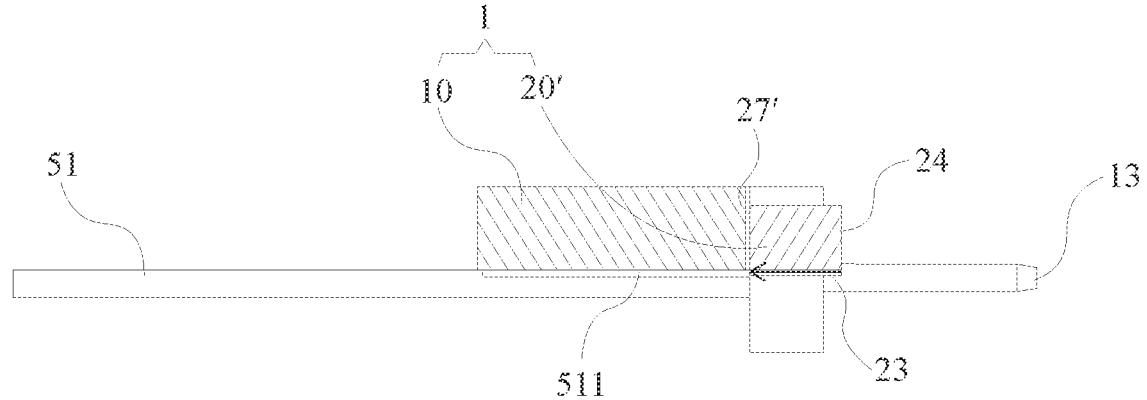
FIG. 9C is a schematic cross-sectional view taken along line B-B of FIG. 8B.

Referring to FIG. 9C, FIG. 9C is a schematic cross-sectional view taken along line B-B of FIG. 8B. In this embodiment, a second guide surface 27′ of a waveguide device 20′ assembled with the base 10 is positioned in front of the signal transmission portion 511 and part of the second guide surface 27′ is facing an edge of the signal transmission portion 511 at boundaries between the second guide surface 27′ and the edge of the photonic integrated circuit 51, such that the light beam from the optical fiber 31 passes straight through the signal transmission portion 511. In some embodiments, the waveguide device 20′ extends outward from the base 10 to facilitate precise alignment with the optical fibers 31 of the second connector 32.

Figure 10:
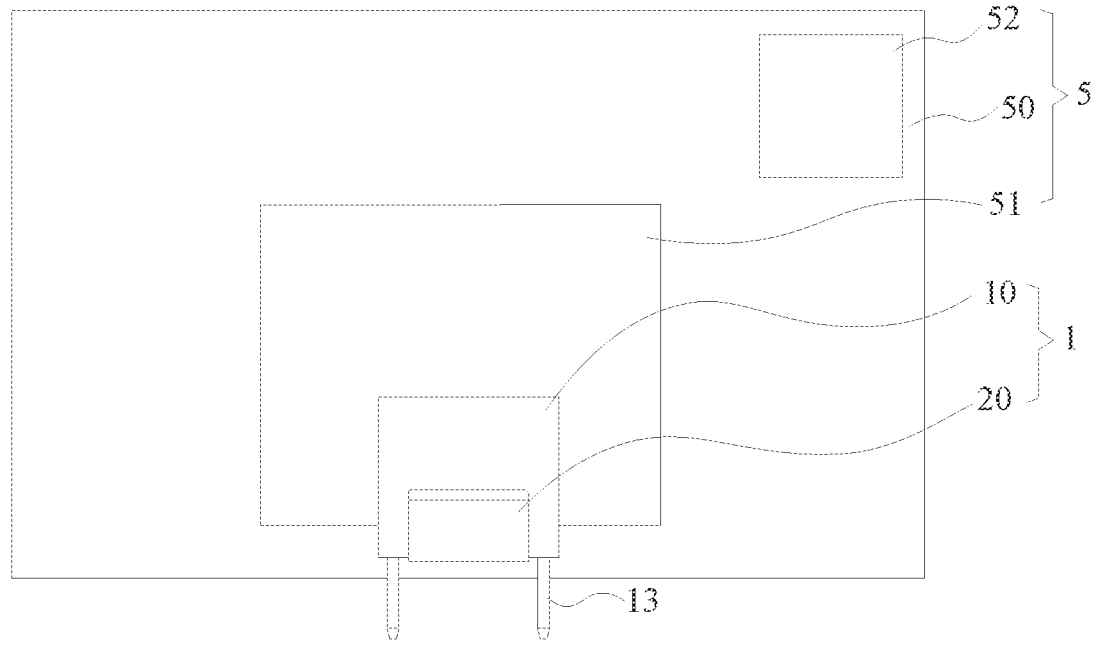
FIG. 10 is a schematic top plan view showing a photonic integrated circuit with a first connector is co-packaged with a carrier board in accordance with an embodiment of the present application.

Referring to FIG. 10, FIG. 10 is a schematic top plan view showing the photonic integrated circuit 51 with the first connector 1 is co-packaged with a carrier board 50. In some embodiments, the carrier board 50 may be a multi-chip module (MCM) functioning as a substrate for multiple chips. For example, an electronic integrated circuit 52 and the photonic integrated circuit 51 are mounted on the carrier board 50 that perform various electrical and optical functions. Since the optical fiber device 3 can be removed from the first connector 1, a detachable connection between the optical fiber device 3 and the photonic integrated circuit 51 can be achieved. As a result, only the base 10 and the waveguide device 20 remain on the photonic integrated circuit 51, and the photonic integrated circuit 51 with the first connector 1 alone can be co-packaged with the carrier board 50 and proceed to other processes, such as reflow processes or back-end processes, such as wire bonding, and molding, thus forming an optoelectronic integrated circuit 5. In doing so, the optical fiber device 3 would not be damaged by the high temperatures during the above-mentioned processes.

Figure 11:
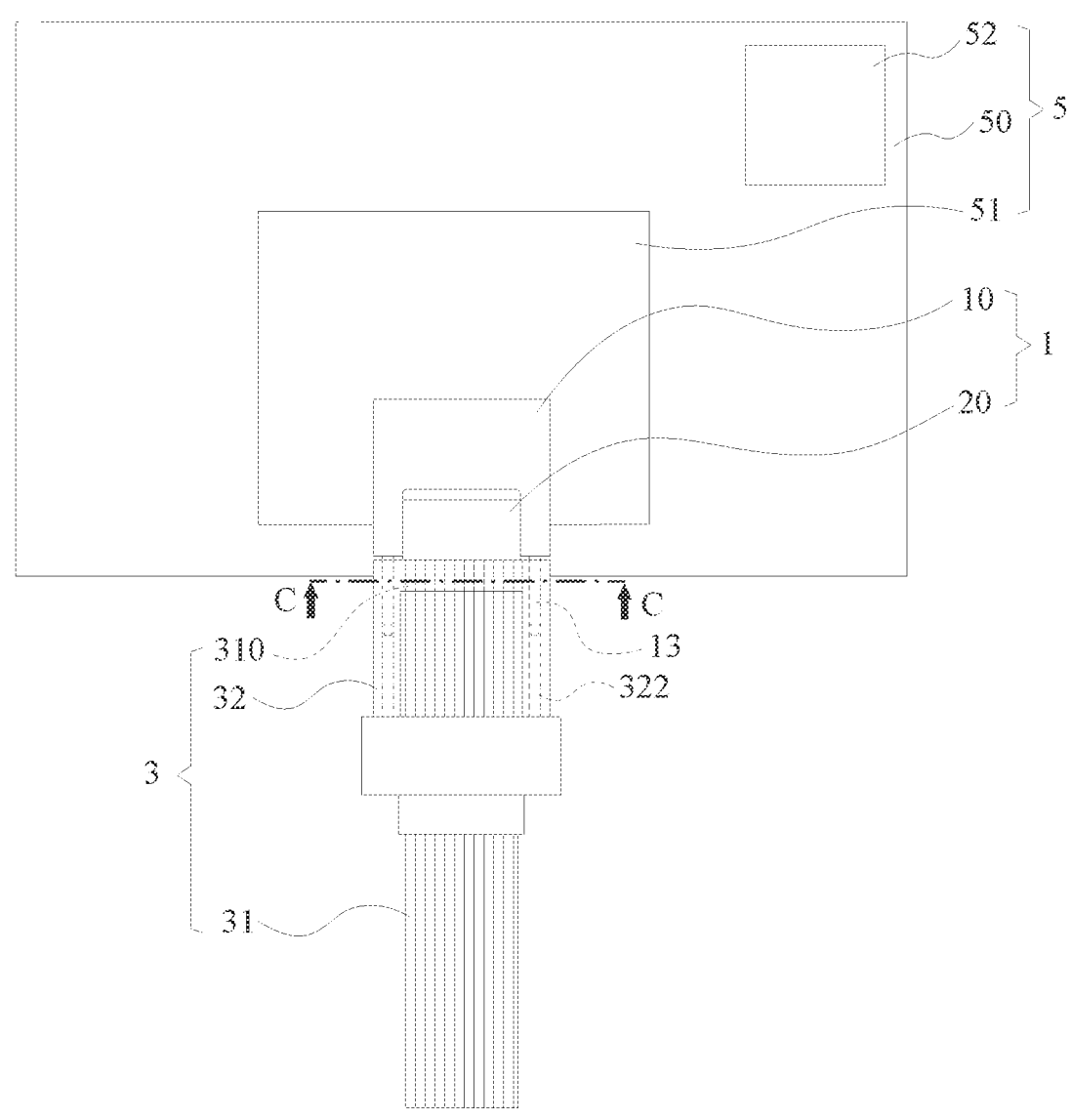
FIG. 11 is a schematic top plan view showing an optical coupling structure connected to a carrier board through a photonic integrated circuit in accordance with an embodiment of the present application.

Referring to FIG. 11, after the photonic integrated circuit 51 with the first connector 1 is co-packaged with the carrier board 50, the optical fiber device 3 may be fixedly connected to the first connector 1 for allowing light signals to be transmitted or received.

Figure 12:
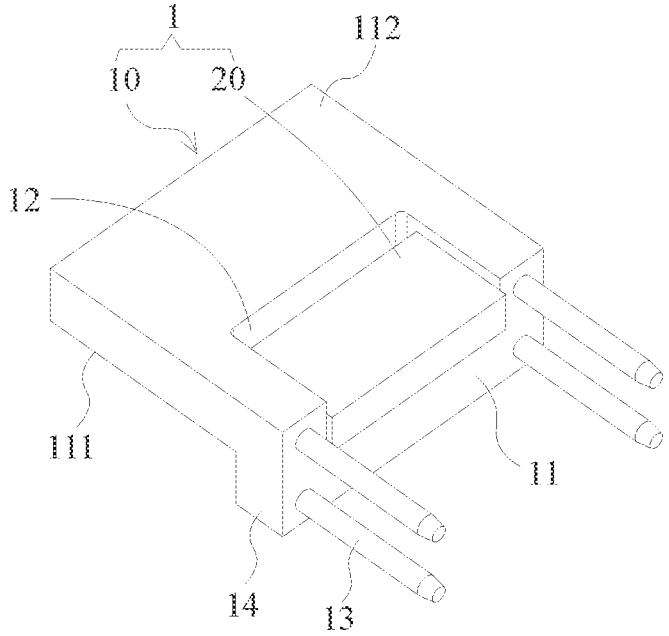
FIG. 12 is a schematic structural view of a first connector of an optical coupling structure in accordance with an embodiment of the present application.

Referring to FIG. 12, FIG. 12 is a schematic structural view of a first connector 1 of an optical coupling structure 100 in accordance with an embodiment of the present application. This embodiment differs from the aforementioned embodiments mainly in that the number of the positioning elements 13 is four, and the four positioning elements 13 are arranged on opposite sides of the front end 11 where the waveguide device 20 is located between the positioning elements 13.

Figure 13A:
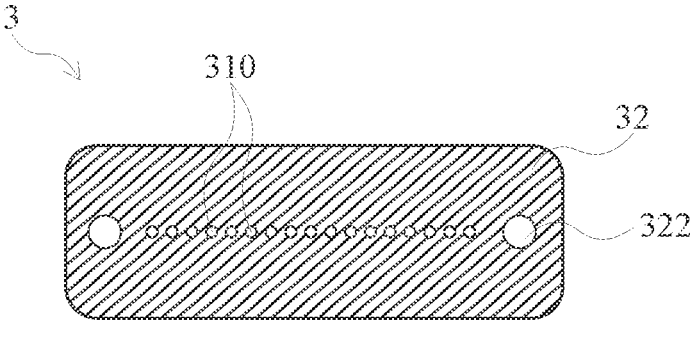
FIGS. 13A, 13B, and 13C are schematic cross-sectional views of an optical fiber device taken along line C-C of FIG. 11 in accordance with different embodiments of the present application.
Figure 13B:
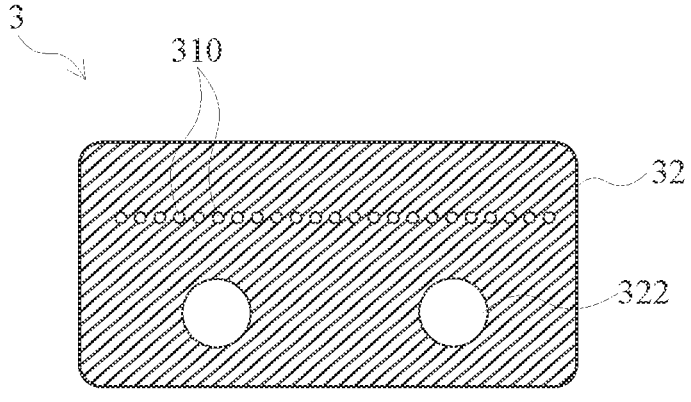
Figure 13C:
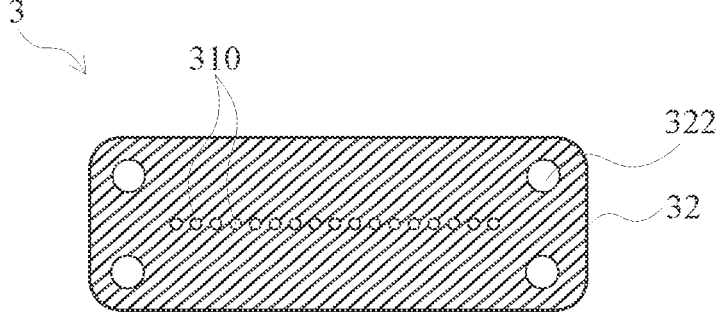

Referring to FIGS. 13A to 13C, FIGS. 13A to 13C are schematic cross-sectional views of an optical fiber device 3 taken along line C-C of FIG. 11 in accordance with different embodiments of the present application. As shown in FIG. 13A, two attaching portions 322 are exposed at opposite side portions of the second connector 32 and extending inwardly for a snug fit with corresponding positioning elements. In this embodiment, the fiber ends 310 of the optical fibers 31 are arranged in a row between the two attaching portions 322.

As shown in FIG. 13B, two attaching portions 322 are exposed at the opposite side portions of the second connector 32 and each have an aperture size greater than that of the attaching portions 322 shown in FIG. 13A. In the embodiment shown in FIG. 13B, the fiber ends 310 are arranged in a row above the attaching portions 322. It should be noted that the configuration of the attaching portions 322 arranged on a same side below the fiber ends 310 as shown in FIG. 13B or arranged in corners of the second connector 32 as shown in FIG. 13C allows for the disposition of a large number of the optical fibers 31 so as to meet the requirement of high density data transmission for co-packaged optics.

As shown in FIG. 13C, four attaching portions 322 are exposed at the opposite side portions of the second connector 32 and each have an aperture size less than that of the attaching portions 322 shown in FIGS. 13A and 13B. In the embodiment shown in FIG. 13C, the fiber ends 310 are arranged in a row between the four attaching portions 322. It should be noted that the positions of the fiber ends 310 and the attaching portions 322 are not limited to the above-mentioned embodiments and may be varied according to the arrangement of the waveguide device 20 and the positioning elements 13.

Figure 14:
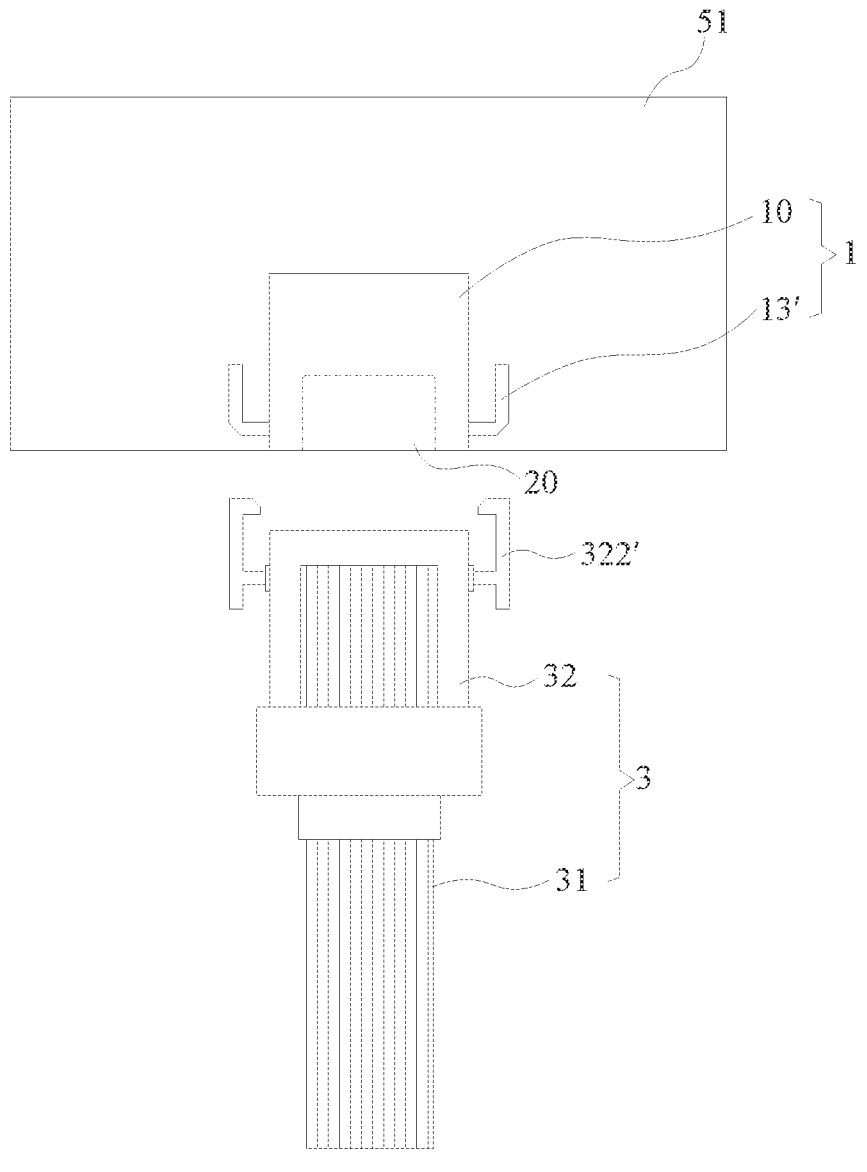
FIG. 14 is a schematic top plan view of an optical coupling structure in accordance with another embodiment of the present application.

Referring to FIG. 14, FIG. 14 is a schematic top plan view of an optical coupling structure in accordance with another embodiment of the present application. This embodiment differs from the aforementioned embodiments mainly in that the attaching portion 322' of the second connector 32 each have a cantilever locking structure to engage with corresponding positioning elements 13' to connect the optical fiber device 3 with the first connector 1.

Figure 15:
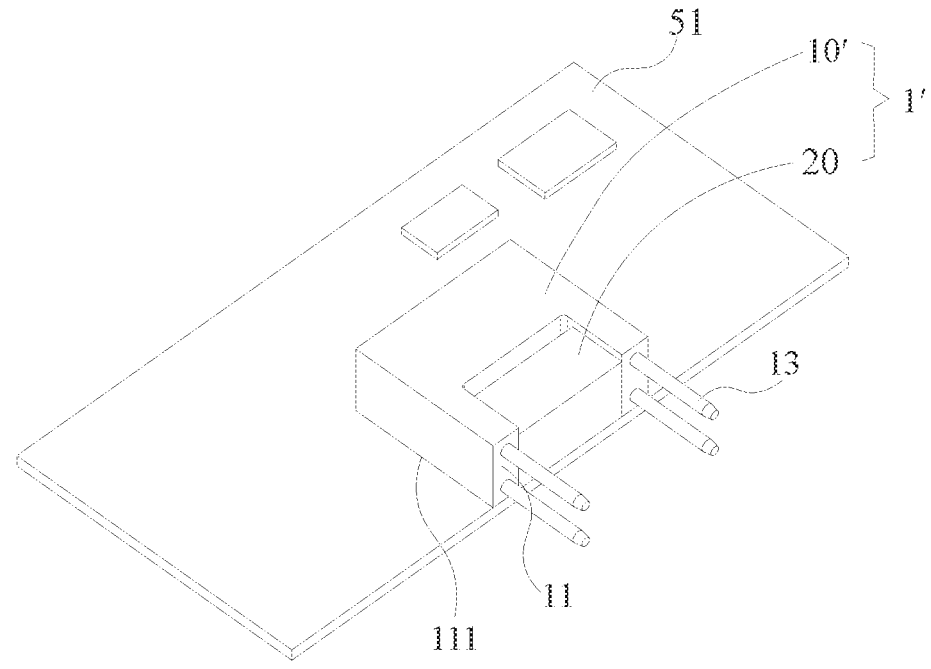
FIG. 15 is a schematic structural view of a first connector in accordance with another embodiment of the present application.

Referring to FIG. 15, FIG. 15 is a schematic structural view of a first connector 1' in accordance with another embodiment of the present application. This embodiment differs from the aforementioned embodiments mainly in that an entire bottom, i.e., the lower surface 111 of the base 10' is arranged on an upper surface of the photonic integrated circuit 51, and the base 10' is positioned adjacent to an edge of the photonic integrated circuit 51, without the provision of the retaining wall 14. In some embodiments, the base 10' may be retreated from the edge of the photonic integrated circuit 51 according to circuit layouts of the photonic integrated circuit 51.

Figure 16:
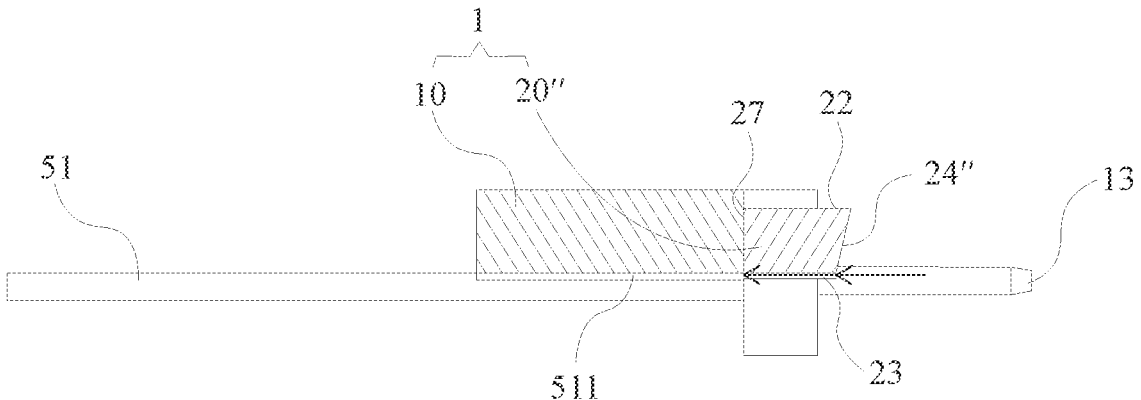
FIG. 16 is a schematic side plan view showing an assembly process of a first connector and an optical fiber device in accordance with another embodiment of the present application.
Figure 17:
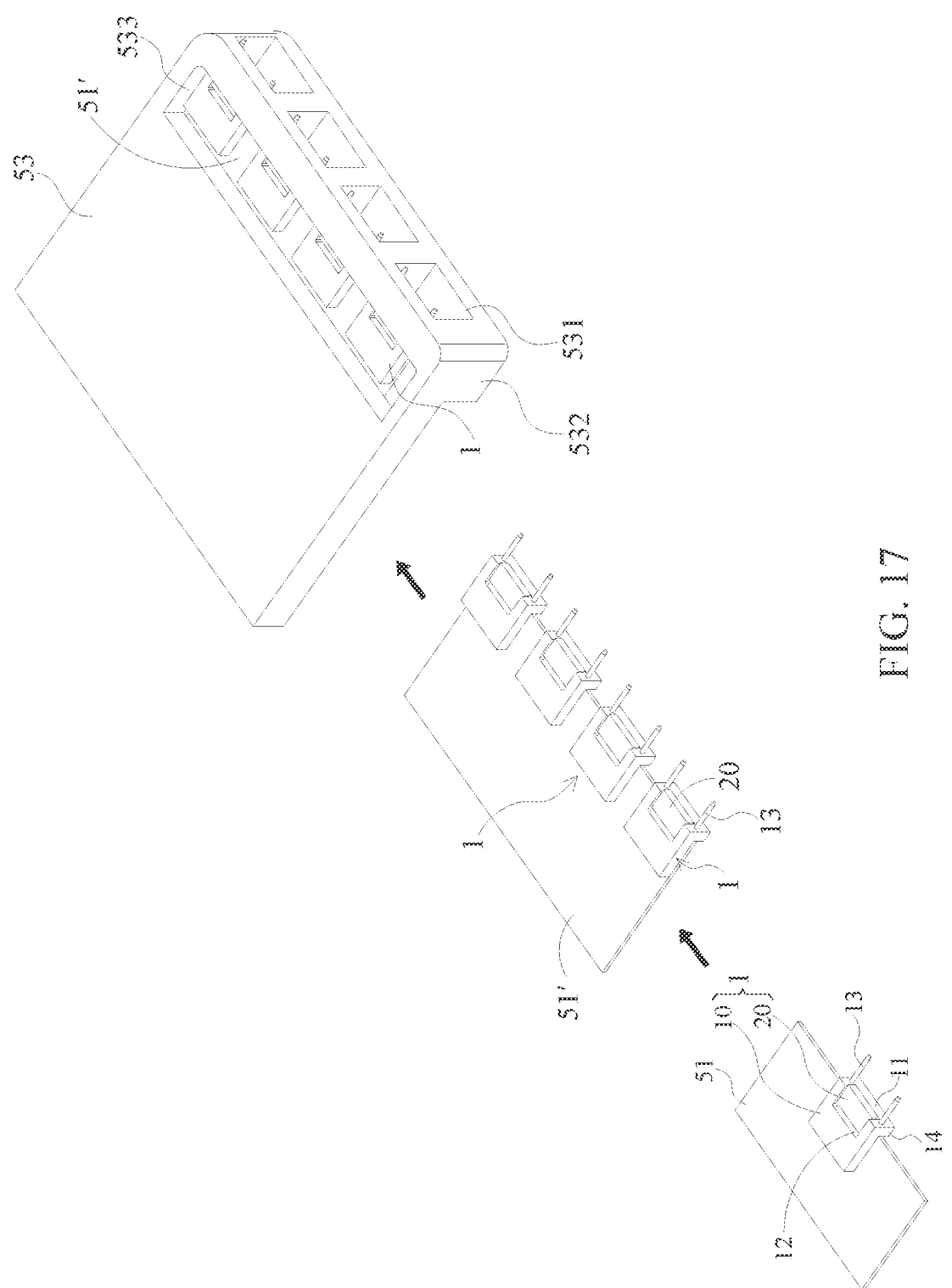
FIG. 17 is a schematic perspective view showing some applications of optical coupling structure in accordance with embodiments of the present application.

Referring to FIG. 16, FIG. 16 is a schematic side plan view showing an assembly process of a first connector 1" and an optical fiber device 3 in accordance with another embodiment of the present application. This embodiment differs from the aforementioned embodiments mainly in that the configuration of the first connector 1". As shown in FIG. 16, the first connector 1" includes a base 10" and a waveguide device 20", and the waveguide device 20" includes a first guide surface 24" tilts with respect to the first surface 22 so that optical waveguide paths 23 are terminated by the tilted first guide surface 24". By means of the tilted configuration of the first guide surface 24", light reflection occurred at boundaries between the first guide surface 24" and the fiber ends 310 of the optical fibers 31 can be prevented when the light beam passes therethrough, which in turn alleviates the problem of signal loss during light signal transmission. Referring to FIG. 17, FIG. 17 is a schematic perspective view showing an application of a first connector in accordance with an embodiment of the present application. As show in FIG. 17, the silicon photonic integrated circuit 51' includes four signal transmission portions (not shown) configured for the first connectors 1, respectively. In detail, there are four first connectors 1 disposed on the signal transmission portions, respectively, and arranged adjacent to a same edge of the photonic integrated circuit 51'. Each of the first connectors 1 is configured to connect with the optical fiber device 3 (not shown for clarity in FIG. 17). In this embodiment, the first connectors 1 are spaced apart from each other at a spacing greater than or equal to a spacing between adjacent two of the second connectors 32 for easy connection to the optical fibers 31.

Still referring to FIG. 17, a casing 53 is provided to shield the photonic integrated circuit 51'. In detail, the casing 53 includes a front opening 531 located in front of the first connectors 1 to allow the second connectors 32 to pass through for plugging to the first connectors 1. In some embodiments, the casing 53 includes a retaining block 532 positioned adjacent to the front opening 531 and extending downward to abut against the carrier board 50 (not shown for clarity in FIG. 17). In other words, the retaining block 532 serves similar function as that of the retaining wall 14 of the base 10. In another embodiment, the casing 53 further includes a top opening 533 formed on a top of the casing 53 for ease observation of the assembly of the first connectors 1 and the second connectors 32.

Figure 18:
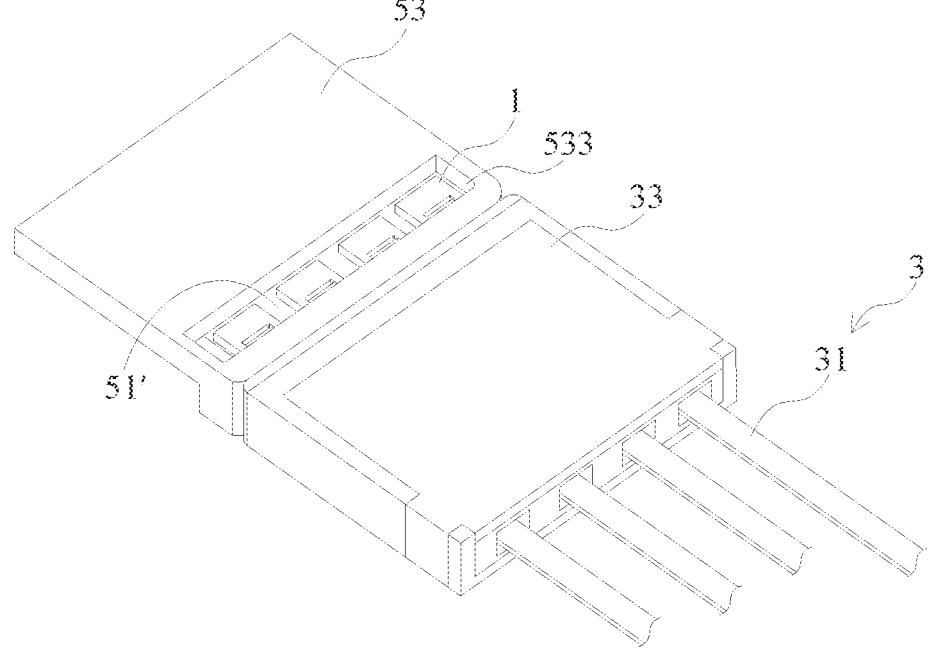
FIG. 18 is a schematic perspective view showing an assembly of a plurality of optical fiber devices and the first connectors shown in FIG. 17.
Figure 19:
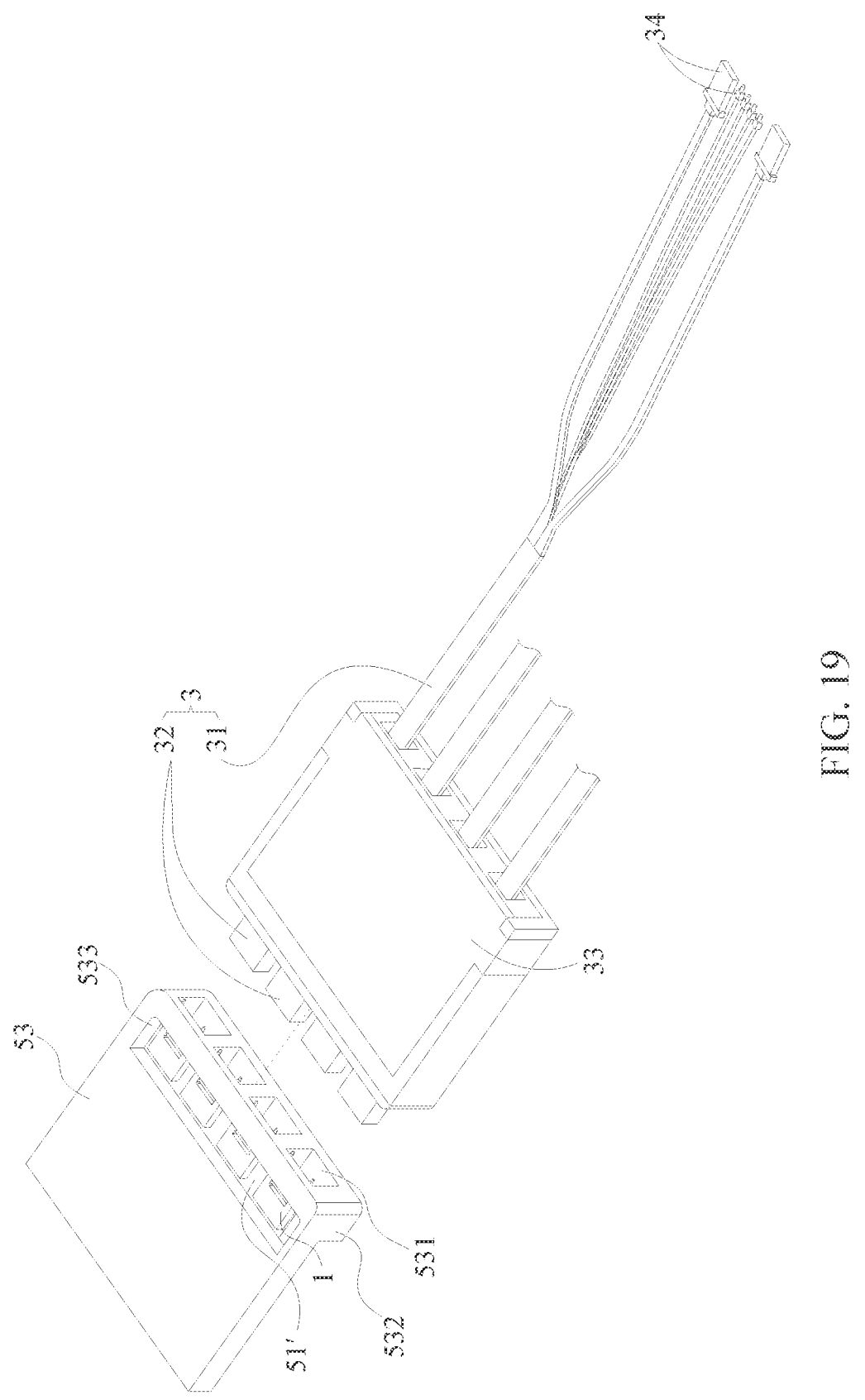
FIG. 19 is a schematic perspective view showing another application of an optical coupling structure in accordance with an embodiment of the present application.

Referring to FIGS. 18 and 19, FIG. 18 is a schematic perspective view showing an assembly of a plurality of optical fibers 31 and the casing 531 shown in FIG. 17. FIG. 19 is a schematic perspective view illustrating another application of the optical coupling structure shown in FIG. 18. A housing 33 is provided for a plurality of the optical fiber devices 3. In detail, the housing 33 is configured to hold a plurality of the optical fiber devices 3 in such a way that the optical fiber devices 3 are spaced apart from each other, with the second connectors 32 arranged in alignment with each other and facing the first connectors, respectively. With the provision of the housing 33, the optical fiber devices 3 can be movable in conjunction with the housing 33 to be simultaneously and detachably connected to the first connectors 1. In doing so, transmission capacity of the photonic integrated circuit 51 can be significantly increased through the optical coupling structure 100.

Referring to FIG. 19, in some embodiments, each of the optical fiber devices 3 may include a plurality of mating connectors 34 at ends of the optical fibers 31 opposite to the second connectors 32. In some embodiments, the mating connectors 34 of each of the optical fiber devices 3 may have different connecting interfaces for connecting to various types of applicable interfaces, which in turn achieves a great diversity in usage.

Referring to FIG. 20, the present application further provides a method 110 of forming an optical coupling structure for an optoelectronic integrated circuit in accordance with an embodiment of the present application. It should be appreciated that the order of the steps of the method is merely exemplary and that the steps can be performed in a wide variety of orders according to actual needs. Descriptions of structural components used in the steps of the method of the present application can be referred to the embodiments and figure drawings as described above, which will not be repeated in detail here. As shown in FIG. 20, the steps of the method 110 includes steps S111 to S119, which will be described in detail below.

Step S111: providing a first connector detachably connected with a second connector of an optical fiber device. The first connector includes a base and a waveguide device assembled in the base. In detail, as shown in FIGS. 4 and 5, the first connector 1 including the base 10 and the waveguide device 20 is connected to the second connector 32 of the optical fiber device 3.

Step S113: positioning the first connector connected with the optical fiber device on the photonic integrated circuit and actively aligning the first connector with a signal transmission portion of the photonic integrated circuit with optical monitoring to enable signal transmission between the optical fiber device and the signal transmission portion through the waveguide device. In detail, as shown in FIGS. 6 and 7, turn on a light transceiver module (not shown) of the photonic integrated circuit 51 to be in condition to transmit or receive light signals. Then, the first connector 1, along with the optical fiber device 3, is placed on the photonic integrated circuit 51 and moves to be in precise alignment with a position where the light signals can be transmitted to or received from the light transceiver module with a highest signal amplitude. As shown in FIGS. 8 and 9, part of the waveguide device 20 directly faces and is in precise alignment with the signal transmission portion 511. In this manner, the position where the first connector 1 is set on the photonic integrated circuit 51 is confirmed. Then perform a curing process on the base 10 to secure the first connector 1 to the photonic integrated circuit 51, so the base 10 can be fixedly disposed on the photonic integrated circuit 51.

Step S115: removing the optical fiber device from the first connector. In detail, as shown in FIGS. 8 and 9, the optical fiber device 3 is detached and removed from the first connector 1.

Step S117: positioning the photonic integrated circuit on the carrier board. In detail, as shown in FIG. 10, the optoelectronic integrated circuit 5 includes the carrier board 50 and the electronic integrated circuit 52. After positioning the photonic integrated circuit on the carrier board, perform at least a reflow process or a back-end process such as wire bonding, and molding, on the first connector 1 and the photonic integrated circuit 51 in combination with the carrier board 50, without attachment of the optical fiber device 3. In other words, the photonic integrated circuit 51 with the first connector 1 is co-packaged with the carrier board 50 and the electronic integrated circuit 52, so as to form the optoelectronic integrated circuit 5.

Step S119: securing the optical fiber device to the first connector through the second connector. In detail, after the photonic integrated circuit 51 with the first connector 1 is co-packaged with the carrier board 50, the optical fiber device 3 may be connected to the first connector 1 again for fixedly connected and allowing light signals to be transmitted or received.

Particularly, with reference to FIG. 21, Step S111 for providing the first connector detachably connected with the second connector of the optical fiber device further includes Steps S1111, S1112, and S1113. In detail, Step S111: connecting the second connector of the optical fiber device to the base excluding the waveguide device. At this phase, as shown in FIG. 1, the waveguide device 20 is not disposed in the base 10. Step S1112: placing the waveguide device in the base. As shown in FIG. 2, after the base 10 and the second connector 32 are detachably connected together, the waveguide device 20 is placed in the recessed portion 12 of the base 10. Step S1113: positioning, by actively aligning the waveguide device with the optical fiber device with optical monitoring to enable the signal transmission between the optical fiber device and the waveguide device, the waveguide device in the base to form the first connector. As shown in FIG. 4, once the waveguide device 20 is accurately positioned in place, apply glue to permanently secure the waveguide device 20 to the base 10, so that the first connector 1 is created by the base 10 and the waveguide device 20. In some embodiments, the waveguide device 20 may be secured to the base 10 in a manner of soldering, welding, or through thermal curing material.

Accordingly, the optical coupling structure provided in the embodiments of the present application utilizes separate disposition of the first connector including the base and the waveguide device, and the optical fiber device including the second connector to achieve the detachable connection between the optical fiber device and the photonic integrated circuit. As a result, only the base and the waveguide device remain on the photonic integrated circuit, and the photonic integrated circuit with the first connector alone can be co-packaged with the carrier board and proceed to other processes. In doing so, the optical fiber device would not be damaged by the high temperatures during the above-mentioned processes, and a great diversity of applications can be fulfilled as well.

While the application has been disclosed in conjunction with a description of certain embodiments, including those that are currently believed to be the preferred embodiments, the detailed description is intended to be illustrative and should not be understood to limit the scope of the present application. As would be understood by one of ordinary skill in the art, embodiments other than those described in detail herein are encompassed by the present application. Modifications and variations of the described embodiments may be made without departing from the scope of the application.

What is claimed is:

1. An optical coupling structure for an optoelectronic integrated circuit, comprising:

a first connector disposed on the optoelectronic integrated circuit and comprising:

a base comprising a lower surface, a front end, and a retaining wall extending and bent downward from the lower surface; and a waveguide device assembled in the base and comprising a first surface, a first guide surface adjoining the first surface and located at the front end, and a plurality of optical waveguide paths extending to the first guide surface, and an optical fiber device comprising a second connector comprising a connecting surface, wherein the second connector is detachably connected to the first connector such that the connecting surface and the first guide surface directly face each other;

wherein the optoelectronic integrated circuit comprises a photonic integrated circuit, the first connector is fixedly arranged on the photonic integrated circuit and comprises a plurality of positioning elements, the retaining wall is positioned adjacent to an edge of the photonic integrated circuit such that the retaining wall abuts against the edge of the photonic integrated circuit, and the positioning elements are arranged on the retaining wall at the front end of the base and spaced apart from each other.

2. The optical coupling structure for the optoelectronic integrated circuit of claim 1, wherein the base further comprises a recessed portion passing through part of the front end and part of the lower surface of the base, and the waveguide device is disposed in the recessed portion.

3. The optical coupling structure for the optoelectronic integrated circuit of claim 1, wherein the positioning elements are pin-like in shape and extend in an outward direction from the front end.

4. The optical coupling structure for the optoelectronic integrated circuit of claim 3, wherein the second connector further comprises a plurality of attaching portions structured to detachably connect to the positioning elements of the first connector.

5. The optical coupling structure for the optoelectronic integrated circuit of claim 1, wherein the optical fiber device further comprises a plurality of optical fibers arranged to correspond to the optical waveguide paths of the waveguide device and having a plurality of fiber ends terminated at the second connector, wherein the first guide surface of the waveguide device and the connecting surface of the second connector are located in front of or to coincide with the fiber ends of the optical fibers.

6. The optical coupling structure for the optoelectronic integrated circuit of claim 1, wherein a plurality of the first connectors are arranged on a same side of the photonic integrated circuit, each of the first connectors is connected with one optical fiber device, and the first connectors are spaced apart from each other at a spacing greater than or equal to a spacing between adjacent two of the second connectors.

7. The optical coupling structure for the optoelectronic integrated circuit of claim 6, further comprising a housing configured to hold the plurality of the optical fiber devices such that the optical fiber devices are movable in conjunction with the housing to be simultaneously and detachably connected to the first connectors.

8. The optical coupling structure for the optoelectronic integrated circuit of claim 1, wherein the optoelectronic integrated circuit further comprises an electronic integrated circuit and a carrier board, and the electronic integrated circuit and the photonic integrated circuit are co-packaged with the carrier board.

9. A method of forming an optical coupling structure for an optoelectronic integrated circuit, the optoelectronic integrated circuit comprising a photonic integrated circuit and a carrier board, and the method comprising:

providing a first connector detachably connected with a second connector of an optical fiber device, wherein the first connector comprises a base and a waveguide device disposed in the base;

positioning the first connector connected with the optical fiber device on the photonic integrated circuit and actively aligning the first connector with a signal transmission portion of the photonic integrated circuit with optical monitoring to enable signal transmission between the optical fiber device and the signal transmission portion through the waveguide device;

removing the optical fiber device from the first connector;

positioning the photonic integrated circuit on the carrier board; and securing the optical fiber device to the first connector through the second connector.

10. The method of forming the optical coupling structure for the optoelectronic integrated circuit of claim 9, wherein after positioning the photonic integrated circuit on the carrier board, performing at least a reflow process or a back-end process on the first connector and the photonic integrated circuit in combination with the carrier board, without attachment of the optical fiber device.

11. The method of forming the optical coupling structure for the optoelectronic integrated circuit of claim 9, wherein the step of providing the first connector detachably connected with the second connector of the optical fiber device comprises:

connecting the second connector of the optical fiber device to the base excluding the waveguide device;

placing the waveguide device in the base; and positioning, by actively aligning the waveguide device with the optical fiber device with optical monitoring to enable the signal transmission between the optical fiber device and the waveguide device, the waveguide device in the base to form the first connector.

12. The method of forming the optical coupling structure for the optoelectronic integrated circuit of claim 9, wherein the first connector comprises a plurality of positioning elements arranged on the base, and the second connector further comprises a plurality of attaching portions structured to detachably connect to the positioning elements of the first connector.

13. The method of forming the optical coupling structure for the optoelectronic integrated circuit of claim 9, wherein after the step of actively aligning the first connector with the signal transmission portion of the photonic integrated circuit with optical monitoring, performing a curing process on the base to secure the first connector to the photonic integrated circuit.

14. An optical coupling structure for an optoelectronic integrated circuit, comprising:

a first connector disposed on the optoelectronic integrated circuit and comprising:

a base comprising a lower surface and a front end; and a waveguide device assembled in the base and comprising a first surface, a first guide surface adjoining the first surface and located at the front end, and a plurality of optical waveguide paths extending to the first guide surface, and an optical fiber device comprising a second connector comprising a connecting surface, wherein the second connector is detachably connected to the first connector such that the connecting surface and the first guide surface directly face each other;

wherein the optoelectronic integrated circuit comprises a photonic integrated circuit, the first connector is fixedly arranged on the photonic integrated circuit and comprises a plurality of positioning elements arranged on the base, and the optical waveguide paths of the waveguide device are arranged in an array and configured to spatially correspond to a signal transmission portion included in the photonic integrated circuit.

15. The optical coupling structure for the optoelectronic integrated circuit of claim 14, wherein the base further comprises a recessed portion passing through part of the front end and part of the lower surface of the base, and the waveguide device is disposed in the recessed portion.

16. The optical coupling structure for the optoelectronic integrated circuit of claim 14, wherein the optical fiber device further comprises a plurality of optical fibers arranged to correspond to the optical waveguide paths of the waveguide device and having a plurality of fiber ends terminated at the second connector, wherein the first guide surface of the waveguide device and the connecting surface of the second connector are located in front of or to coincide with the fiber ends of the optical fibers.

17. The optical coupling structure for the optoelectronic integrated circuit of claim 14, wherein a plurality of the first connectors are arranged on a same side of the photonic integrated circuit, each of the first connectors is connected with one optical fiber device, and the first connectors are spaced apart from each other at a spacing greater than or equal to a spacing between adjacent two of the second connectors.

18. The optical coupling structure for the optoelectronic integrated circuit of claim 17, further comprising a housing configured to hold the plurality of the optical fiber devices such that the optical fiber devices are movable in conjunction with the housing to be simultaneously and detachably connected to the first connectors.

19. The optical coupling structure for the optoelectronic integrated circuit of claim 14, wherein the optoelectronic integrated circuit further comprises an electronic integrated circuit and a carrier board, and the electronic integrated circuit and the photonic integrated circuit are co-packaged with the carrier board.

\* \* \* \* \*